US006632911B1

United States Patent
Takahashi et al.

(10) Patent No.: US 6,632,911 B1
(45) Date of Patent: Oct. 14, 2003

(54) ETHYLENE/α-OLEFIN COPOLYMER AND FILM MADE THEREOF

(75) Inventors: Kuninori Takahashi, Mie (JP); Yoshiyuki Ishihama, Mie (JP); Etsushi Akashige, Mie (JP); Fumiyo Ikehata, Mie (JP); Hisao Uchida, Mie (JP); Mikio Kawase, Mie (JP)

(73) Assignee: Japan Polychem Corporation, Tokyo (JP)

( * ) Notice: Subject to any disclaimer, the term of this patent is extended or adjusted under 35 U.S.C. 154(b) by 92 days.

(21) Appl. No.: 09/704,612

(22) Filed: Nov. 3, 2000

(30) Foreign Application Priority Data

Nov. 5, 1999 (JP) .............................. 11-316130

(51) Int. Cl.$^7$ ............................................. C08F 210/16
(52) U.S. Cl. .................... 526/348.1; 526/130; 526/160; 526/348
(58) Field of Search ................... 526/348, 160, 526/130

(56) References Cited

U.S. PATENT DOCUMENTS

| | | | | |
|---|---|---|---|---|
| 4,632,801 A | * | 12/1986 | Dowd ........................ | 264/566 |
| 4,981,760 A | * | 1/1991 | Naito et al. ................ | 428/523 |
| 5,258,161 A | * | 11/1993 | Ealer ......................... | 264/566 |
| 5,420,220 A | * | 5/1995 | Cheruvu et al. .......... | 526/348.1 |
| 5,928,982 A | * | 7/1999 | Suga et al. ................ | 502/118 |
| 6,034,187 A | * | 3/2000 | Maehama et al. ......... | 526/72 |
| 6,048,817 A | * | 4/2000 | Sagae et al. ............... | 502/117 |
| 6,110,858 A | * | 8/2000 | Kaneko et al. ............. | 502/62 |
| 6,316,557 B1 | * | 11/2001 | Sato et al. ................. | 526/118 |

FOREIGN PATENT DOCUMENTS

| | | | | |
|---|---|---|---|---|
| EP | 0 781 789 | | 7/1997 | |
| EP | 0 781 789 A2 | * | 7/1997 | ......... C08F/210/16 |
| EP | 0 839 842 | | 5/1998 | |
| EP | 0 839 842 A2 | * | 5/1998 | ......... C08F/210/16 |
| EP | 1 097 949 A1 | | 5/2001 | ......... C08F/210/16 |
| JP | 11-293055 A | * | 10/1999 | ........... C08L/23/08 |
| WO | WO 94/14855 | | 7/1994 | |
| WO | WO 94/14855 A1 | * | 7/1994 | ........... C08F/4/628 |
| WO | WO 96/16119 | | 5/1996 | |
| WO | WO 99/65957 | | 12/1999 | |

OTHER PUBLICATIONS

English abstract translation of JP11–293055 A.*

Patent Abstracts of Japan, vol. 2000, No. 01, AN 2000–018780, Jan. 31, 2000, JP 11–293055, Oct. 26, 1999.

Patent Abstracts of Japan, vol. 1997, No. 02, Feb. 28, 1997, JP 08–283480, Oct. 29, 1996.

Patent Abstracts of Japan, vol. 1998, No. 11, Sep. 30, 1998, JP 10–168130, Jun. 23, 1998.

* cited by examiner

*Primary Examiner*—David W. Wu
*Assistant Examiner*—Rip A Lee
(74) *Attorney, Agent, or Firm*—Oblon, Spivak, McClelland, Maier & Neustadt, P.C.

(57) ABSTRACT

An ethylene/α-olefin copolymer having a density of 0.900 to 0.965 g/cm$^3$; having an MI of 0.01 to 100 g/10 minutes; in a chromatogram with the use of Rayleigh ratio obtained by extrapolating GPC-MALLS data at a scattering angle of 0°, showing an average Mc obtained by measuring five times of 0.5% or more and a standard deviation <σ> from the average of 35% or less, wherein Mc stands for the chromatographic area ratio of the components having molecular weight of 1,000,000 or more calculated on the basis of the above measurement; and having a W30 (weight fraction of the portion eluted below 30° C.) in CFC measurement of 1 (% by weight) or less; and a film thereof.

17 Claims, No Drawings

ETHYLENE/α-OLEFIN COPOLYMER AND FILM MADE THEREOF

BACKGROUND OF THE INVENTION

1. Field of the Invention

This invention relates to novel ethylene/α-olefin copolymers. More particularly, it relates to ethylene/α-olefin copolymers which are excellent in transparency and gloss, show high blocking resistance and exhibit well-balanced modulus and strength when processed into films by blown film extrusion.

2. Description of the Related Art

It has been a practice to produce copolymers of ethylene with α-olefins by the polymerization mainly using Zeigler-Natta catalysts. Blown Films of these copolymers are excellent in mechanical characteristics (tensile strength, impact strength, etc.) and, therefore, used in a large amount for various purposes, for example, bags.

However, blown films of these ethylene/α-olefin copolymers alone suffer from a problem of showing poor transparency.

Therefore, it has been a practice in the field with a need for high transparency to blend these ethylene/α-olefin copolymers with low-density polyethylene produced by the high-pressure-process (hereinafter referred to simply as HPLD) which has an excellent effect of improving transparency to thereby ensure high transparency. However, this method brings about an increase in the production cost of the resin compositions. From the viewpoint of physical properties, moreover, there arise several problems, for example, a decrease in strength and worsening of blocking resistance in association with an increase in transparency.

Ethylene/α-olefin copolymers produced by the polymerization using metallocene catalysts, which have been employed in recent years, are superior in transparency in the low density region (density; 0.918 or less) to the ethylene/α-olefin copolymers obtained by using Ziegler-Natta catalysts. However, the transparency of the former ethylene/α-olefin copolymers is worsened with an increase in density. Thus, the ethylene/α-olefin copolymers having a density of 0.918 or more, which are commonly employed as packing films, cannot show any sufficient transparency. In the field with a need for high transparency, therefore, it is also needed to blend these copolymers with HPLD.

In addition, no sufficient transparency cannot be established even by elevating the molecular weight by performing the multi-stage polymerization as proposed by JP-A-3-23717 or by using two or more metallocene compounds as proposed by JP-A-5-155932 and JP-A-60-35006 (the term "JP-A" as used herein means an "unexamined published Japanese patent application").

Further, JP-A-10-168130 points out that the transparency can be improved by regulating the storage modulus and loss modulus each in a definite range. Even in this case, it is scarcely possible to establish such performance satisfying the requirement in the field with a need for high transparency.

Therefore, it has been urgently required to develop an ethylene/α-olefin copolymer whereby these problems can be solved. However, it is impossible by the related art not only to obtain a ethylene/α-olefin copolymer which can be processed into films with sufficient transparency but also to clarify the polymer structure for achieving this object.

SUMMARY OF THE INVENTION

This invention aims at providing ethylene/α-olefin copolymers which show sufficient transparency and excellent mechanical properties (modulus, strength, etc.), processing properties, blocking resistance, heat sealing properties and heat sealing strength when processed into films by blown film extrusion.

The inventors have conducted extensive studies to solve the above problems. As a result, they have made it possible to uniformly form components of ethylene/α-olefin copolymers for improving the transparency, compared with the related art.

Further, the inventors have clarified components worsening the transparency.

Furthermore, they have successfully found out that ethylene/α-olefin copolymers with excellent transparency can be obtained by elevating the balance between the improving components and the worsening components to such an extent which cannot be achieved by the related art and regulating the contents of these components each within a definite range, thereby completing the invention.

Accordingly, the ethylene/α-olefin copolymer of the invention is a copolymer of ethylene with an α-olefin having 3 to 20 carbon atoms characterized by satisfying the following physical properties (a) to (d):

(a) having a density of 0.900 to 0.965 g/cm$^3$;

(b) having a melt index (MI; 190° C., under a 2.16 kg load) of 0.01 to 100 g/10 min;

(c) in a chromatogram with the use of Rayleigh ratio obtained by extrapolating GPC-MALLS (Gel Permeation Chromatography-Multi Angle Laser Light Scattering detector) data at a scattering angle of 0°, showing an average of Mc: $\overline{Mc}$ obtained by the "five-point measurement method" of 0.5% or more and a standard deviation <σ> from the average of 35% or less, wherein Mc stands for the chromatographic area ratio of the components having molecular weight of 1,000,000 or more calculated on the basis of the above measurement; and (d) having a W30 (weight fraction of the portion eluted from TREF column below) in CFC measurement of 1 (% by weight) or less.

The ethylene/α-olefin copolymer according to the invention is characterized by satisfying the following requirement (e), in addition to the above-described requirements (a) to (d):

(e) having a flow ratio FR (=$I_{10kg}/I_{2.16kg}$) of 7.0 or less, wherein $I_{10kg}$ stands for the melt index measured at 190° C. under a 10 kg load and $I_{2.16kg}$ stands for the melt index measured at 190° C. under a 2.16 kg load.

The ethylene/α-olefin copolymer according to the invention is characterized by satisfying the following requirements (f) or the requirements (e) and (f), in addition to the above-described requirements (a) to (d):

(f) having a ratio Mw/Mn of 1.5 to 3.5, wherein Mw stands for the weight-average molecular weight obtained by GPC measurement and Mn stands for the number-average molecular weight.

The ethylene/α-olefin copolymer according to the invention is an ethylene/α-olefin copolymer satisfying the above-described requirements (a) to (d), (a) to (e), (a) to (d) and (f), or (a) to (f), characterized by having a density of 0.918 (g/cm$^3$) or less.

Further, the ethylene/α-olefin copolymer according to the invention is an ethylene/α-olefin copolymer satisfying the above-described requirements (a) to (d), (a) to (e), (a) to (d) and (f), or (a) to (f), characterized by having a density of 0.918 (g/cm$^3$) or more and satisfying the following requirements (g):

(g) having Mc and W74 (weight fraction (% by weight) of the portion eluted from TREF column below 74° C.) in CFC measurement satisfying the following relationship (i):

$$W74<5.5\text{Log}\{Mc\}+15 \qquad (i).$$

Furthermore, the ethylene/α-olefin copolymer according to the invention is an ethylene/α-olefin copolymer satisfying the following physical properties (a') to (d'):

(a') having a density of 0.900 to 0.955 g/cm$^3$;

(b') having a melt index (MI; 190° C., under a 2.16 kg load) of 0.01 to 100 g/10 min;

(c') in a chromatogram with the use of Rayleigh ratio obtained by extrapolating GPC-MALLS data at a scattering angle of 0°, showing a chromatographic area ratio of the components having molecular weight of 1,000,000 or more, calculated on the basis of the above measurement, of 1% or more; and (d') having Mc and W74 (weight fraction (% by weight) of the portion eluted from TREF column below 74° C. ) in CFC measurement satisfying, the following relationship (ii):

$$W74<5.5\text{Log}\{Mc\}+10 \qquad (ii).$$

The film according to the invention is processed by extruding the ethylene/α-olefin copolymer as described above.

DETAILED DESCRIPTION OF THE INVENTION

Now, modes for carrying out the invention will be described.

The ethylene/α-olefin copolymer according to the invention is a copolymer (preferably a random copolymer) of ethylene with an α-olefin having 3 to 20 carbon atoms. Examples of the α-olefin to be used herein as a comonomer include propylene, butene-1, 3-methylbutene-1, 3-methylpentene-1, 4-methylpentene-1, hexene-1, octene-1, pentene-1, decene-1, tetradecene-1, hexadecene-1, octadecene-1 and eicosene-1. Either one of these α-olefins or a mixture of two or more thereof may be employed. Among these α-olefins, those having 3 to 10 carbon atoms are still preferable and examples thereof include propylene, butene-1, 3-methylbutene-1, 4-methylpentene-1, hexene-1, octene-1, pentene-1 and decene-1.

Regarding the ratio of ethylene to the α-olefin in the above-described ethylene/α-olefin copolymer, it is preferable that the ethylene content amounts to 70 to 99.5% by weight while the α-olefin content amounts to 0.5 to 30% by weight. It is still preferable that the ethylene content amounts to 80 to 99% by weight while the α-olefin content amounts to 1 to 20% by weight. It is further preferable that the ethylene content amounts to 87 to 98% by weight while the α-olefin content amounts to 2 to 13% by weight. So long as the ethylene content falls within this range, the film obtained by blown film extrusion can achieve a favorable balance between modulus and strength.

<Physical Properties>

Now, the physical properties (a) to (g) as described above will be illustrated.

(a) Density

The ethylene/α-olefin copolymer according to the invention has a density of form 0.900 to 0.965 (g/cm$^3$). In case of having a density less than 0.900 g/cm$^3$, the copolymer has a low stiffness and is poor in suitability for an automatic bag-making machine. In case where the density exceeds 0.965 g/cm$^3$, the transparency, impact resistance and heat sealing properties are worsened. From the viewpoint of the balance between the mechanical strength and transparency, it is preferable that the above-described density ranges from 0.910 to 0.945 g/cm$^3$, still preferably from 0.915 to 0.940 g/cm$^3$.

The density means a value which is determined in accordance with JIS-K7112 by heating a strand obtained in the measurement of melt index at 100° C. for an hour, allowing to stand for additional one hour and then measuring by the density gradient tube method.

(b) Melt Index (MI)

The ethylene/α-olefin copolymer according to the invention has a melt index (MI; 190° C., under a 2.16 kg load) of 0.01 to 100 g/10 min. In case of having an MI less than 0.01 g/10 min, the copolymer has poor extrusion properties. In case where this MI exceeds 100 g/10 min, the blown film properties are worsened. Form the viewpoint of the balance between the extrusion properties and the blown film properties, MI preferably ranges from 0.1 to 10 g/10 min, still preferably from 0.3 to 4.0 g/10 min, and particularly preferably from 0.7 to 2.5 g/10 min. The MI means a value which is determined in accordance with JIS K6760 at 190° C. under a 2.16 kg load.

(c) Mc, $\overline{Mc}$ and $<\sigma>$

Mc means the chromatographic area ratio of the components having molecular weight of 1,000,000 or more in a chromatogram with the use of Rayleigh ratio obtained by extrapolating GPC-MALLS data at a scattering angle of 0°.

$\overline{Mc}$ means the average of Mc obtained by the "five-point measurement method" which will be described hereinafter.

$<\sigma>$ means the standard deviation from the average obtained by the "five-point measurement method", i.e., $\sigma/\overline{Mc} \times 100$.

In the ethylene/α-olefin copolymer according to the invention, it is necessary that $\overline{Mc}$ is 0.5% or more and $<\sigma>$ is 35% or less.

Taking the transparency of the ethylene/α-olefin copolymer into consideration, the components with high relaxation times inhibit the growth of the crystal structure and thus achieve an improving effect. It is assumed that the transparency is further improved with an increase in the relaxation time and an increase in the weight ratio of these components.

On the other hand, the physical meaning of the chromatogram with the use of Rayleigh ratio obtained by extrapolating GPC-MALLS data at a scattering angle of 0° resides in the plot of the product of the molecular weight of eluting component and concentration.

The relaxation time of the ethylene/α-olefin copolymer is expressed as a function of molecular weight and the relaxation time is prolonged as the molecular weight is increased.

In the chromatogram with the use of Rayleigh ratio obtained by extrapolating GPC-MALLS data at a scattering angle of 0°, therefore, relaxation corresponds to molecular weight while weight ratio corresponds to concentration.

Since the effect of preventing the growth of crystal structure is mainly shown by components having molecular weight of 1,000,000 or more and very long relaxation time, the effect of improving the transparency can be evaluated by Mc, i.e., the area ratio of the components having molecular weight of 1,000,000 or more.

In case of having this Mc less than 0.5%, only little improving effect can be achieved and thus the film has an insufficient transparency. To achieve a sufficient transparency, Mc should be at least 0.5%, preferably at least 1% and still preferably at least 2%.

Segmentation, if any, of components having molecular weight of 1,000,000 or more in the product causes not only an insufficient transparency but also deterioration therein. This is because no effect of sufficiently improving the transparency is established in some parts due to the segmentation so that the effect of improving the transparency is worsened all over the product. In such a case, it is also observed that the transparency is worsened by uneven elongation in the molding step. Therefore, it is necessary to minimize the segmentation of these components in the product.

To fully establish the effect of these components, it is therefore necessary to improve the dispersion in the polymerization step.

This is because, in case where these components are formed in the polymerization in a segmented state, it is very difficult to sufficiently them in the product by kneading, since components with high molecular weight are generally poor in dispersibility.

In the case of solution blending, the polymer becomes uniform in the molten state but phase separation frequently arises in the step of removing the solvent because of the large difference in molecular weight or composition. Thus, no favorable dispersibility can be established in this case too.

When the components having molecular weight of 1,000,000 or more represented by Mc are not stable structurally, the molecular structures are sometimes broken in the granulating or molding step. In such a case, the product suffers from the segmentation of these components too.

In case where these components exist as masses (generally called a gel), they form so-called fish eyes, thereby not only worsening the appearance but also failing to achieve the effect of inhibiting the growth of crystals.

In such a case, the components forming masses are eliminated by a filter attached to the measuring apparatus and thus the standard deviation from the average is enlarged.

The filter attached to the apparatus is a sintered metal filter having a particle size of 3 to 5 $\mu$m. When the GPC-Malls measurement is carried out repeatedly, serious segmentation of the components having molecular weight of 1,000,000 or more results in an increase in the standard deviation of Mc.

Definition of "Five-point Measurement Method"

In the GPC-Malls measurement performed herein, a sample weighing 20 mg is taken from a product (a film, a sheet, a pellet, a powder, etc.) and dissolved in a solvent to give a concentration. Then 0.3 ml of the sample solution is employed in evaluation.

This evaluation procedure is performed in samples taken at five or more different points of the product.

It is to be understood that a single sample is not subjected to the evaluation five times or more but samples obtained from different points of a product are put into different containers and subjected to the evaluation individually.

It is not appropriate to subject a single sample to the measurement five times or more repeatedly, since the segmentation of the components, if any, in the product might be solved by uniform dispersion in the solvent.

Based on the Mc data obtained by this five-point measurement, the average $\overline{Mc}$ and the standard deviation $\sigma$ are determined in accordance with the following formula and the ratio of the standard deviation $<\sigma>$ to the average (i.e., $\sigma/\overline{Mc}\times100$) (%) is obtained.

Formula (iii)

$$\overline{Mc} = \frac{\sum_{i=1}^{n} Mci}{n} \quad (n=5)$$

$$\sigma = \sqrt{\frac{\sum_{i=1}^{n}(Mci - \overline{Mc})}{n}} \quad (n=5)$$

It is necessary that the standard deviation $<\sigma>$ from the average is 35% or less, preferably 30% or less and still preferably 25% or less.

The upper limit of Mc varies depending on the processing conditions. Namely, the upper limit increases with a decrease in the strain or stress in the processing step.

It is preferable that the upper limit of Mc is 12% or less in blown film extrusion generally employed in the art. In case of a thick film, a low processing speed or a high extruding temperature, however, it is favorable that the upper limit of Mc is 50% or less. In case where a thick film is formed at a low speed compared with blown film extrusion (for example, as in sheet extrusion), the higher upper limit is the more favorable.

(d) W30 (Weight Fraction of the Portion Eluted From TREF Column Below 30° C. in CFC Measurement)

The ethylene/$\alpha$-olefin copolymer according to the invention has a W30 (weight fraction of the portion eluted from TREF column below 30° C.) in CFC measurement of 1 (% by weight) or less.

The components eluting at 30° C. or below worsen the blocking resistance. In addition, these components sometimes lower the transparency of the film too. Therefore, it is preferable to regulate the content of these components to 1 (% by weight) or less, still preferably to 0.5 (% by weight) or less. It is still preferable that the copolymer is substantially free from these components (i.e., not more than the detection limit 0.1% by weight).

(e) Flow Ratio FR ($=I_{10kg}/I_{2.16kg}$) Wherein $I_{10kg}$ Stands for the Melt Index Measured at 190° C. Under a 10 kg Load and $I_{2.16kg}$ Stands for the Melt Index Measured at 190° C. Under a 2.16 kg Load The ethylene/$\alpha$-olefin copolymer according to the invention has an FR as defined above of 7 or less. It is undesirable that the FR exceeds 7, since such a copolymer suffers from a decrease in strength when processed into a film or a sheet. It is preferable that the FR is 6.8 or less.

(f) Ratio Mw/Mn Wherein Mw Stands for the Weight-average Molecular Weight Obtained by GPC Measurement and Mn Stands for the Number-average Molecular Weight The ethylene/$\alpha$-olefin copolymer according to the invention has a molecular weight distribution expressed in Mw/Mn obtained by GPC measurement of 1.5 to 3.5. In case of having an Mw/Mn ratio less than 1.5, the copolymer has poor extrusion properties. When the Mw/Mn ratio exceeds 3.5, the physical properties (in particular, strength) of the film are worsened. From the viewpoint of the balance between the extrusion properties and the physical properties, it is desirable that the Mw/Mn ratio is from 2.0 to 3.3.

Among ethylene/$\alpha$-olefin copolymers satisfying the requirements (a) to (d), (a) to (e), (a) to (d) and (f), or (a) to (f) as described above, one having a density of 0.918 (g/cm$^3$) or less exerts a sufficient transparency.

This is because, when processed into a film, such an ethylene/$\alpha$-olefin copolymer satisfying these requirements shows little aggregation of lamellae and exerts a sufficient effect owing to $\overline{Mc}$ and $\sigma$ satisfying the above requirements.

Thus, the transparency is not worsened even though there exist low crystallinity components.

On the other hand, among ethylene/α-olefin copolymers satisfying the requirements (a) to (d), (a) to (e), (a) to (d) and (f), or (a) to (f) as described above, one having a density of 0.918 (g/cm$^3$) or more has a high transparency. When such an ethylene/α-olefin copolymer satisfies the following requirement (g), a still higher transparency can be established:

(g) Having Mc and W74 (Weight Fraction (% by Weight) of the Portion Eluted Below 74° C.) in CFC Measurement Satisfying the Following Relationship (i):

$$W74 < 5.5 \text{Log} \{Mc\} + 15 \qquad (i).$$

This is because, when such an ethylene/α-olefin copolymer satisfying the above requirements is processed into a film, lamellas are aggregated and in the state of spherulite in its crystal structure. Thus the components with high relaxation time exhibit the effect of improving the transparency by lessening the spherulite size.

On the other hand, an increase in the low crystallinity components, which exist among lamellae or spherulites, brings about an increase in the height and rise of spherulite at the surface. Thus, the surface roughness caused by crystal structure is further clarified and light scattering on the surface is enhanced, thereby worsening the transparency.

The low crystallinity components, which enhance the height and rise of spherulites at the surface, can be expressed as W74, i.e., the weight fraction (% by weight) of the portion eluted below 74° C. An increase in these components results in a decrease in the transparency.

Accordingly, the transparency is determined depending on the balance between the effect of improving the transparency expressed in Mc and the effect of worsening the transparency expressed in W74. Namely, the transparency of a film is elevated with an increase in Mc or with a decrease in W74.

In case of an ethylene/α-olefin copolymer wherein the properties (a) to (d) fail to satisfy the above requirements, a film obtained by blown film extrusion the ethylene/α-olefin copolymer has a poor transparency. That is to say, it is necessary to satisfy the requirements (a) to (d) to give a film having an excellent transparency.

In contrast thereto, ethylene/α-olefin copolymers obtained by various techniques which are publicly known hitherto cannot satisfy the requirements (a) to (d).

Although some of the ethylene/α-olefin copolymers obtained by using Ziegler-Natta catalysts have broad molecular weight distribution and high Mc, low crystallinity components are formed at the same time. As a result, these ethylene/α-olefin copolymers show W30 (i.e., the weight fraction of the portion eluted below 30° C. in CFC measurement) exceeding 1% by weight.

The ethylene/α-olefin copolymers obtained by using metallocene catalysts, which have been employed in recent years, have narrow compositional distribution and have W30 (i.e., the weight fraction of the portion eluted below 30° C. in CFC measurement) not exceeding the detection limit. However, these ethylene/α-olefin copolymers also have narrow molecular weight distribution and, therefore, contain little components having molecular weight of 1,000,000 or more, thereby showing Mc of 0.5% or less.

Similarly, ethylene/α-olefin copolymers obtained by two-stage polymerization or by using two or more metallocene catalysts to broaden the molecular weight distribution show little increase in Mc (i.e., 0.5% or less) or have W30 exceeding 1% by weight.

This is because the formation of low crystallinity components can be hardly inhibited while broadening the molecular weight distribution toward the extremely high molecular weight side, since broadening of molecular weight distribution is usually accompanied by broadening of the compositional distribution in polymerization.

Even though the components having molecular weight of 1,000,000 or more can be imparted while inhibiting the formation of the low crystalline components, it is impossible by the existing techniques to sufficiently uniformly from these components. Thus, there is no ethylene/α-olefin copolymer having a W30 or 1% or less and still having a standard deviation <σ> from the average of 35% or less.

To solve this problem, the inventors have conducted improvements and, as a result, successfully obtained the ethylene/α-olefin copolymer satisfying the requirements (a) to (d).

According to a first embodiment of the present invention shown above, the ethylene/α-olefin copolymer improved in transparency is attained by dispersing the super high molecular weight component uniformly.

Furthermore, in a second embodiment of the present invention, an ethylene/α-olefin copolymer improved in transparency is attained by coping with both the increase of super high molecular weight component and cutting down the weight fraction of the portion eluted in a low temperature extremely.

The ethylene/α-olefin copolymer of the second embodiment of the present invention is characterized by satisfying the following requirements (a') to (d').

(a') Density (d)

The ethylene/α-olefin copolymer according to the invention has a density (d) of form 0.900 to 0.955 (g/cm$^3$). In case of having a density less than 0.900 g/cm$^3$, the copolymer has a low stiffness and is poor in suitability for an automatic bag-making machine. In case where the density exceeds 0.955 g/cm$^3$, the transparency, impact resistance and heat sealing properties are worsened. From the viewpoint of the balance between the mechanical strength and transparency, it is preferable that the above-described density ranges from 0.910 to 0.945 g/cm$^3$, still preferably from 0.920 to 0.940 g/cm$^3$.

(b') Melt Index (MI)

The ethylene/α-olefin copolymer according to the invention has a melt index (MI; 190° C., under a 2.16 kg load) of 0.01 to 100 g/10 min. In case of having an MI less than 0.01 g/10 min, the copolymer has poor extrusion properties. In case where this MI exceeds 100 g/10 min, the blown film properties are worsened. Form the viewpoint of the balance between the extrusion properties and the blown film properties, MI preferably ranges from 0.1 to 10 g/10 min, still preferably from 0.3 to 4.0 g/10 min, and particularly preferably from 0.7 to 2.5 g/10 min.

(c') GPC-Malls Chromatographic Area Ratio (Mc)

Mc means the chromatograhic area ratio of the components having weight molecular weight of 1,000,000 or more in a chromatogram with the use of Rayleigh ratio obtained by extrapolating GPC-MALLS data at a scattering angle of 0°.

Taking the transparency of the ethylene/α-olefin copolymer into consideration, the components with high relaxation times inhibit the growth of the crystal structure and thus achieve an improving effect. It is assumed that the transparency is further improved with an increase in the relaxation time and an increase in the weight ratio of these components.

On the other hand, since the chromatogram with the use of Rayleigh ratio obtained by extrapolating GPC-MALLS data at a scattering angle of 0° represents the product of the molecular weight of eluting component and concentration, the relaxation time corresponds to the molecular weight, and the weight fraction corresponds to the concentration. Accordingly, the Mc value: the area ratio of the components having weight molecular weight of 1,000,000 or more can evaluate the effect of improving the transparency.

In case of having this Mc less than 1%, only little improving effect can be achieved and thus the film has an insufficient transparency. To achieve a sufficient transparency, Mc should be at least 1%, preferably at least 3% and still preferably at least 5%.

The upper limit of Mc varies depending on the processing conditions. Namely, the upper limit increases with a decrease in the strain or stress in the processing step.

It is preferable that the upper limit of Mc is 12% or less in blown film extrusion generally employed in the art. In case of a thick film, a low processing speed or a high extruding temperature, however, it is favorable that the upper limit of Mc is 50% or less. In case where a thick film is formed at a low speed compared with blown film extrusion (for example, as in sheet extrusion), the higher upper limit is the more favorable. (d') Relationship Between Weight Fraction (% by Weight) of the Portion Eluted From TREF Column Below 74° C. (W74) and Mc The relationship between Mc and W74 (weight fraction (% by weight) of the portion eluted below 74° C.) in CFC (Cross Fraction Chromatography) measurement satisfying the following relationship (i):

$$W74 < 5.5 \log \{Mc\} + 10 \quad (i).$$

With respect to the transparency of the ethylene/α-olefin copolymer, the polymer components with high relaxation time shows an improving effect, but the increased low crystallinity components worsen the transparency. Accordingly, when W74 (weight fraction (% by weight) of the portion eluted below 74° C.) in CFC is increased, the transparency is worsened. Accordingly, the transparency is determined depending on the balance between the effect of improving the transparency expressed in Mc and the effect of worsening the transparency expressed in W74. Namely, the transparency of a film by blown film extrusion is elevated with an increase in Mc or with a decrease in W74.

In case of an ethylene/α-olefin copolymer wherein the balance of the both is not within in the scope of the above relationship (i), a film obtained by blown film extrusion the ethylene/α-olefin copolymer has a poor transparency. That is to say, it is necessary to satisfy the above relationship (i) to give a film having an excellent transparency.

Further, when the relationship (ii), below is satisfied (hereinafter requirement (e')), more excellent transparency is attained than conventional ethylene resin composition as well as ethylene/α-olefin copolymer.

$$W74 < 5.5 \log \{Mc\} + 2 \quad (ii).$$

(e') Flow Ratio FR ($=I_{10kg}/I_{2.16kg}$) Wherein $I_{10kg}$ Stands for the Melt Index Measured at 190° C. Under a 10 kg Load and $I_{2.16kg}$ Stands for the Melt Index Measured at 190° C. Under a 2.16 kg Load The ethylene/α-olefin copolymer according to the invention has an FR as defined above of 7 or less. It is undesirable that the FR exceeds 7, since such a copolymer suffers from a decrease in strength when processed into a film or a sheet. It is preferable that the FR is 6.8 or less.

(f) Ratio Mw/Mn Wherein Mw Stands for the Weight-average Molecular Weight Obtained by GPC Measurement and Mn Stands for the Number-average Molecular Weight The ethylene/α-olefin copolymer according to the invention has a molecular weight distribution expressed in Mw/Mn of 1.5 to 3.5. In case of having an Mw/Mn ratio less than 1.5, the copolymer has poor extrusion properties. When the Mw/Mn ratio exceeds 3.5, the strength is worsened when the ethylene/α-olefin copolymer is formed into a film or sheet. From the viewpoint of the balance between the extrusion properties and the physical properties, it is desirable that the Mw/Mn ratio is from 2.0 to 3.3.

(g') W30 (Weight Fraction of the Portion Eluted From TREF Column Below 30° C. in CFC Measurement)

The ethylene/α-olefin copolymer according to the invention has a W30 (weight fraction of the portion eluted from TREF column below 30° C. (room temperature)) in CFC measurement of 0.5 (% by weight) or less.

The components eluting at 30° C. or below worsen the blocking resistance when processed into a film. Accordingly, there cause problems that it gets difficult to peel films each other, it gets difficult to open when it is used as a bag, and it gets difficult to peel off when it is rolled up on a paper pipe. In addition, these components sometimes lower the transparency of the film too. Therefore, it is preferable to regulate the content of these components to 0.5 (% by weight) or less, in view of blocking resistance and transparency. It is still preferable in view of blocking resistance that the copolymer is substantially free from these components (i.e., not more than the detection limit 0.1% by weight).

<Production Method>

Next, a method for obtaining the ethylene/α-olefin copolymer according to the invention having the above-described physical properties will be illustrated. (The periodic law of atoms employed herein is based on the 18 group system recommended by UUPAC in 1989.)

To obtain the ethylene/α-olefin copolymer satisfying the physical properties (a) to (d), or (a') to (d'), it is desirable to polymerize ethylene with an α-olefin (1-butene, 1-hexene, etc.) in the presence of a catalyst system containing the components [A] and [B] optionally together with [C] as specified below. However, the invention is not restricted to the production method or catalyst system.

[A] Transition metal (one of the groups 4 to 6 in the periodic table) compound having at least one conjugated 5-membered cyclic ligand.
[B] Ion-exchangeable layered silicate.
[C] Organic aluminum compound.

(1) Component [A]

The component [A] to be used in the catalyst of the invention is a compound of a transition metal of one of the groups 4 to 6 in the periodic table having at least one conjugated 5-membered cyclic structure ligand. Preferable examples of the transition metal compound include compounds represented by the following general formulae [1], [2], [3] and [4]:

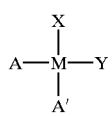

[1]

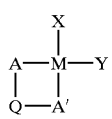

[2]

-continued

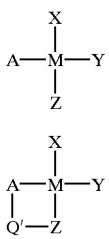

[3]

[4]

wherein A and A' represent each a ligand having a conjugated 5-membered cyclic structure, provided that A and A' in a single compound may be either the same or different; Q represents a linking group whereby the two conjugated 5-membered cyclic ligands are crosslinked at an arbitrary position; Z represents a ligand containing a nitrogen atom, an oxygen atom, a silicone atom, a phosphorus atom or a sulfur atom, a hydrogen atom, a halogen atom or a hydrocarbon group bonded to M; Q' represents a linking group whereby the conjugated 5-membered cyclic ligand is crosslinked with Z at an arbitrary position; M represents a metal atom selected from among the metals of the groups 4 to 6 in the periodic table; and X and Y represent each a hydrogen atom, a halogen atom, a hydrocarbon group, an alkoxy group, an amino group, a phosphorus-containing hydrocarbon group or a silicone-containing hydrocarbon group bonded to M.

As described above, A and A' are conjugated 5-membered cyclic ligands which may be either the same or different in a single compound. As a typical example of these conjugated 5-membered cyclic ligands (A and A'), citation may be made of a conjugated carbon 5-membered cyclic ligand, i.e., cyclopentadienyl group. This cyclopentadienyl group may carry five hydrogen atoms (i.e., $C_6H_5$). Alternatively, use may be made of its derivatives wherein some of these hydrogen atoms have been substituted. Examples of the substituents include hydrocarbon groups having 1 to 20 (preferably 1 to 12) carbon atoms. Such a hydrocarbon group may be bonded as a nonviolent group to the cyclopentadienyl group. When the derivative has plural substituents, two of these substituents may bonded respectively to the ends (ω-ends) of the cyclopentadienyl group to thereby form a ring together with a part of the cyclopentadienyl group. Typical examples of the latter include those wherein two substituents are bonded respectively to the ω-ends to form a fused 6 or 7-membered ring having the two adjacent carbon atoms of the cyclopentadienyl group in common, namely, indenyl, fluorenyl and azulenyl groups.

Accordingly, it may be said that the conjugated 5-membered cyclic ligands (A and A') are typified by substituted or unsubstituted cyclopentadienyl, indenyl, fluorenyl and azulenyl groups.

In addition to the above-described hydrocarbon groups having 1 to 20 (preferably 1 to 12) carbon atoms, examples of the substituents of the cyclopentadienyl group include halogen groups (for example, fluorine, chlorine, bromine), alkoxy groups (for example, $C_1$ to $C_{12}$ alkoxy groups), silicone-containing hydrocarbon groups (for example, $C_1$ to $C_{24}$ groups containing silicone atom as —Si($R^1$)($R^2$)($R^3$)), phosphorus-containing hydrocarbon groups (for example, $C_1$ to $C_{18}$ groups containing phosphorus atom as —P($R^1$)($R^2$)), nitrogen-containing hydrocarbon groups (for example, $C_1$ to $C_{18}$ groups containing nitrogen atom as —N($R^1$)($R^2$)) and boron-containing hydrocarbon groups (for example, $C_1$ to $C_{18}$ groups containing boron atom as —B($R^1$)($R^2$)). In case wherein the cyclopentadienyl group has plural substituents, these substituents may be either the same or different.

Q represents a linking group whereby the two conjugated 5-membered cyclic ligands are crosslinked at an arbitrary position, Q' represents a linking group whereby the conjugated 5-membered cyclic ligand is crosslinked with Z at an arbitrary position. Preferable examples thereof include alkylene, silylene and germilene groups.

M represents a metal atom selected from the groups 4 to 6 in the periodic table. It is preferable that M is an atom of the group 4, more particularly, titanium, zirconium or hafnium.

Z represents a ligand containing a nitrogen atom, an oxygen atom, a silicone atom, a phosphorus atom or a sulfur atom, a hydrogen atom, a halogen atom or a hydrocarbon group bonded to M.

X and Y represent each a hydrogen atom, a halogen atom, a hydrocarbyl group having 1 to 20 (preferably 1 to 10) carbon atoms, an alkoxy group having 1 to 20 (preferably 1 to 10) carbon atoms, an amino group, a phosphorus-containing hydrocarbon group having 1 to 20 (preferably 1 to 10) carbon atoms (more particularly, diphenylphosphine group) or a silicone-containing hydrocarbon group having 1 to 20 (preferably 1 to 10) carbon atoms (more particularly, trimethylsilyl group, bis(trimethylsily)methyl group). X and Y may be either the same or different. Among these groups, halogen groups, hydrocarbon groups (in particular, those having 1 to 8 carbon atoms) and amino group are preferable.

In the invention, the component [A] may be used as a mixture of two or more compounds represented by the same general formula and/or different general formulae.

In case where M is zirconium, examples of the transition metal compounds are as follows.
(a) Compounds represented by the general formula [1], i.e., transition metal compounds having no linking group Q but two conjugated 5-membered cyclic ligands, for example:
(1) bis(cyclopentadienyl)zirconium dichloride,
(2) bis(dimethylcyclopentadienyl)zirconium dichloride,
(3) bis(pentamethylcyclopentadienyl)zirconium dichloride,
(4) bis(n-butylcyclopentadienyl)zirconium dichioride,
(5) bis(n-butyl-methyl-cyclopentadienyl)zirconium dichloride,
(6) (cyclopentadienyl)(etyl-methyl-cyclopentadientyl)-zirconium dichloride,
(7)(n-butylcyclopentadienyl)(dimethylcyclopentadienyl)-zirconium dichloride,
(8) bis(indenyl)zirconium dichloride,
(9) bis(tetraindenyl)zirconium dichloride,
(10) bis(2-methylindenyl)zirconium dichloride,
(11) bis(fluorenyl)ziconium dichloiride,
(12) bis(cyclopentadienyl)zirconum dimethyl,
(13) (cyclopentadienyl)(indenyl)ziconium dichloride,
(14) (cyclopentadienyl)(azulenyl)zirconium dichloride, etc.
(b) Compounds represented by the general formula [2], wherein the linking group Q is an alkylene group (b-1), for example:
(1) methylenebis(indenyl)zirconium dichloride,
(2) ethylenebis(indenyl)zirconium dichloride,
(3) ethylenebis(4,5,6,7-tetrahydroindenyl)zirconium dichloride,
(4) ethylenebis(2-methylindenyl)zirconium dichloride,
(5) ethylene (2,4-dimethylcyclopentadienyl) (3',5'-dimethylcyclopentadienyl)zirconium dichloride,
(6) ethylene 1, 2-bis [4-(2, 7-dimethylindenyl)]zirconium dichloride, (7) isopropylidenebis(indenyl)zirconium dichloride,
(8) methylene(cyclopentadienyl)(3,4-dimethylcyclopentadienyl)zirconium dichloride,
(9) isopropylidene(cyclopentadienyl) (3,4-dimethylcyclopentadienyl)zirconium dichloride,
(10) isopropylidene(cyclopentadienyl)(fluorenyl)zirconium dichloride,
(11) ethylene(cyclopentadienyl)(3,5-dimethylpentadienyl) zirconium dichloride,
(12) ethylene(2,5-dimethylcyclopentadienyl)(fluorenyl) zirconium dichloride,
(13) diphenylmethylene(cyclopentadienyl)(3,4-diethyl-cyclopentadienyl)zirconium dichloride,
(14) cylohexylidene(cyclopentadienyl)(fluorenyl)zirconium dichloride,
(15) dichlor{1,1'-dimethylmethylenebis[2-methyl-4-(4-bisphenyl)-4H-azulenyl]}zirconium, etc.

(b-2) Wherein Q is a silylene group, for example:
(1) dimethylsilylenebis(2-methylindenyl)zirconium dichloride,
(2) dimethylsilylenebis(2,4-dimethylindenyl)zirconium dichloride,
(3) dimethylsilylenebis(2-methyl-4,5,6,7-tetrahydroindenyl)zirconium dichloride,
(4) dimethylsilylenebis(2-methyl-4,5-benzoindenyl) zirconium dichloride,
(5) dimethylsilylenebis(2-methyl-4-phenylindenyl) zirconium dichloride,
(6) dimethylsilylenebis[4-(2-phenylindenyl)]zirconium dichloride,
(7) dimethylsilylenebis[4-(2-phenyl-3-methylindenyl)] zirconium dichloride,
(8) phenylmethylsilylenebis(4,5,6,7-tetrahydroindenyl) zirconium dichloride,
(9) phenylmethylsilylene(2,4-dimethylcyclopentadienyl)-(3', 5'-dimethylcyclopentadienyl)zirconium dichloride,
(10) diphenylsilylenebis(indenyl)zirconium dichloride,
(11) tetramethyldisilylenebis(cyclopentadienyl)zirconium dichloride,
(12) dimethylsilylene(cyclopentadienyl)(triethylcyclopenta-dienyl)zirconium dichloride,
(13) dimethylsilylene(cyclopentadienyl)(fluorenyl) zirconium dichloride,
(14) dimethylsilylene(diethylcyclopentadienyl) (octahydrofluorenyl)zirconium dichloride,
(15) dimethylsilylenebis[1-(2-methyl-4-phenyl-4H-azulenyl]zirconium dichloride, etc.

(b-3) Wherein Q is a hydrocarbon group containing germanium, phosphorus, nitrogen, boron or aluminum, for example:
(1) dimethylgermaniumbis(indenyl)zirconium chloride,
(2) methylaluminumbis(indenyl)zirconium dichloride,
(3) phenylphosphinobis(indenyl)zirconium dichloride,
(4) phenylamino(cyclopentadienyl)(fluorenyl)zirconium dichloride, etc.

(c) Compounds represented by the general formula [3], i.e., transition metal compounds having no linking group Q' but one conjugated 5-membered cyclic ligand, for example:
(1) pentamethylcyclopentadienyl-bis(phenyl) aminozirconium dichloride,
(2) indenyl-bis(phenyl)amidozirconium dichloride,
(3) pentamethylcyclopentadienyl-bis(trimethylsilyl)aminozirconium dichloride,
(4) pentamethylcyclopentadienylphenoxyzirconium dichloride,
(5) pentamethylcyclopentadienylzirconium trichloride,
(6) cyclopentadienylzirconium benzylchloride, etc.

(d) Compounds represented by the general formula [4], i.e., transition metal compounds having one conjugated 5-membered cyclic ligand crosslinked via a linking group Q', for example:
(1) dimethylsilylene(tetramethylcyclopentadienyl)phenyl-amidozirconium dichloride,
(2) dimethylsilylene(tetramethylcyclopentadienyl) tert-butylamidozirconium dichloride,
(3) dimethylsilylene(indenyl)cyclohexylamidozirconium dichloride,
(4) dimethylsilylene(tetrahydroindenyl) decylamidozirconium dichloride,
(5) dimethylsilylene(tetrahydroindenyl)((trimethylsilyl)-zirconium dichloride,
(6) dimethylgerman(tetramethylcyclopentadienyl)(phenyl)-aminozirconium dichloride, etc.

(e) It is also possible to use the compounds of the above (a) to (e) wherein chlorine is substituted by bromine, iodine, hydrido, methyl, phenyl, etc.

In the compounds cited above as examples, di-substituted cyclopentadienyl rings include 1,2- and 1,3-substituted ones, while tri-substituted cyclopentadienyl rings include 1,2,3- and 1,2,4-substituted ones.

In the invention, it is furthermore possible to use, as the component [A], compounds having titanium, hafnium, vanadium, niobium, molybdenum, tungsten, etc. as a substitute for the zirconium in the compounds cited in the above (a) to (e). Among these compounds, it is preferable to use zirconium compounds, hafnium compounds and titanium compounds, still preferably hafnium compounds.

(2) Component [B]

The ion-exchangeable layered silicates to be used as the component [B] in the invention are silicate compounds having a crystalline structure wherein faces constructed by ionic bond, etc. are laminated in parallel via weak bonding strength and containing exchangeable ions. Although most of ion-exchangeable layered silicates occur in nature as the main component of clay minerals. the ion-exchangeable layered silicates to be used herein are not restricted to natural ones but use can be made of artificially synthesized ones.

Particular examples of the ion-exchangeable layered silicates include publicly known layered silicates described in, for example, "Nendo Kobutsu gaku", Yasuo Shiramizu, Asakura-Shoten (1995) such as compounds of the kaolin group (dickite, nacrite, kaolinite, anauxite, metahalloysite, halloysite, etc.), compounds of the serpentine group (chrysotile, lizardite, antigorite, etc.), compounds of the smectite group (montmorillonite, sauconite, beidellite, nontronite, saponite, teniorite, stevensite, etc.), compounds of the vermiculite group (vermiculite, etc.), compounds of the mica group (mica, illite, sericite, glauconite, etc.), attapulgite, sepiolite, palygorskite, bentonite, pyrophyllite, talc and compounds of the chlorite group. These layered silicates may form mixed layers. Among them, preferable examples of the layered silicates include compounds of the smectite group such as montmorillonite, sauconite, beidellite, nontronite, saponite, hectorite, stevensite, bentonite and teniorite, compounds of the vermiculite group and compounds of the mica group.

Typical examples of the compounds of the smectite group include montmorillonite, beidellite, saponite, nontronite, hectorite, sauconite, etc. Also, use can be made of marketed products such as "Benclay SL" (manufactured by Mizusawa Kagaku), "Kunipia" and "Smecton" (manufactured by Kunimine Kogyo), "Montmorillonite K10" (manufactured by Aldrich and Sud-Chemie) and "K-Catalyst Series" (manufactured by Sud-Chemie).

Typical examples of the compounds of the mica group include common mica, paragonite, phlogopite, biotite and lepidolite. It is also possible to use marketed products such as "Gosei Unmo Somasifu (synthetic mica Somasifu)" (manufactured by Corp Chemical) and "Fusso Kin Unmo (fluorine phlogopite)", "Fusso Yon-Keiso Unmo (fluorine tetrasilicic mica)" and "Teniorite" (manufactured by Topy Kogyo).

It is also possible to chemically treat the component [B]. As the chemical treatment to be carried out herein, use can be made of a surface treatment whereby impurities adhering on the surface are eliminated or a treatment affecting the clay crystalline structure.

As the chemical treatment, it is preferable to carry out a salt treatment and/or an acid treatment. By effecting the salt treatment and/or the acid treatment, the acid strength of a solid can be changed. It is necessary in the invention that at least 30%, preferably at least 40% and still preferable at least 60%, of the ion-exchangeable cations contained in at least one compound selected from the group consisting of the ion-exchangeable layered silicates before the salt treatment are exchanged with cations dissociating from the salts specified below. The salts to be used in the salt treatment, which is carried in the invention to exchange ions, are compounds containing cations involving at least one atom selected form the atoms of the groups 2 to 14.

One of these salts may be used alone. Alternatively, two or more thereof may be used simultaneously and/or successively.

By the acid treatment, impurities on the surface can be eliminated and, moreover, cations (Al, Fe, Mg, etc.) in the crystalline structure are partly or totally eluted. It is preferable to select the acid to be used in the acid treatment from among hydrochloric acid, sulfuric acid, nitric acid, acetic acid and oxalic acid. Two or more of salts and acids may be employed in the treatment. In case where the salt treatment is combined with the acid treatment, the salt treatment may be performed followed by the acid treatment, the acid treatment may be performed followed by the salt treatment, or the salt treatment and the acid treatment may be performed at the same time.

The salt and acid treatments may be performed under arbitrary conditions without restriction. It is usually favorable to carry out these treatments at a salt or acid concentration of 0.1 to 50% by weight, at a temperature of from room temperature to the boiling point, for 5 minutes to 24 hours under such conditions that at least a part of substances constituting at least one compound selected from the group consisting of the ion-exchangeable layered silicates can be eluted. Although the salts and acids are usually employed as aqueous solution, it is possible in some cases to perform these treatments in organic solvents such as acetone, ethanol, hexane or toluene.

The granular properties of the component [B] can be controlled by grinding, granulating, sizing, classifying, etc. before, during or after the salt and/or acid treatments. An arbitrary procedure may be selected therefor depending on the purpose. Examples of granulation procedures include spray granulation, rolling granulation, compression granulation, agitation granulation, briqueting, compacting, extrusion granulation, fluidized bed granulation, emulsion granulation and submerged granulation. Among these procedures, spray granulation, rolling granulation and compression granulation are particularly preferable.

The component [B] usually contains adsorption water and interlayer water. The term "adsorption water" as used herein means water absorbed on the surface or crystal fracture surface of the ion-exchangeable layered silicate, while the term "interlayer water" as used herein means water existing among crystal layers. It is usually favorable to eliminate the adsorption water and/or the interlayer water from the component [B] by heating. The heating method for eliminating the adsorption water of the ion-exchangeable layered silicate and the interlayer water is not particularly restricted. Use may be made therefor of heat dehydration, heat dehydration under a gas flow, heat dehydration under reduced pressure, azeotropic dehydration together with an organic solvent or the like. It is preferable to heat under an inert gas (nitrogen, etc.) flow. It is undesirable to use a method whereby a rigid crosslinked structure is formed (for example, heating under air flow), since the polymerization activity of the catalyst is worsened thereby.

Drying may be carried out by, for example, heating and dehydrating in a closed container under reduced pressure or heating and drying under a dry nitrogen gas flow, etc. by using a batch-type or continuous rotary kiln generally employed in the art. To completely eliminate the interlayer water, the heating temperature is at least 100° C., preferably at least 150° C. and still preferably at least 180° C., though an excessively high temperature causing structural fracture (for example, 800° C. or more) is not preferable. It is favorable to carry out the heating at 400° C. or below. The heating is usually performed for 0.5 minute or longer, preferably for 1 minute or longer and still preferably 3 minutes or longer, though the heating time varies depending on the moisture content before heating, etc. In this treatment, the moisture content of the component [B] after the elimination should be 3% by weight or less, preferably 1% by weight or less, referring the moisture content achieved after dehydrating at 200° C. under 1 mmHg for 2 hours as to 0% by weight.

(3) Component[C]

Examples of the organic aluminum compounds employed, if needed, as the component [C] in the invention are those represented by the following formula:

wherein $R^8$ represents a $C_{1-20}$ hydrocarbon group; X represents hydrogen, halogen or an alkoxy group; and j is a number exceeding 0 but not more than 3.

Particular examples of the organic aluminum compounds as described above include trialkylalminums (trimethylaluminum, trietylaluminum, tripropylaluminum, tri-iso-butylaluminum, etc.) and halogen- or alkoxy-containing alkylaluminum (diethylaluminum monochloride, diethylaluminum methoxide, etc.). In addition, use can be also made of aluminoxanes such as methylaluminoxane. Among all, trialkylaluminums are particularly preferable.

(4) Preparation of Catalyst

In the invention, it is preferable that the above-described components [A] and [B] and the optional component [C] are brought into contact with ethylene and pre-polymerized to give a catalyst. The components [A] and [B] and the optional component [C] may be brought into contact in the following orders, though the invention is not restricted thereto.

(1) The component [A] is brought into contact with the component [B].

(2) The component [A] is brought into contact with the component [B] and then the component [C] is added.

(3) The component [A] is brought into contact with the component [C] and then the component [B] is added.

(4) The component [B] is brought into contact with the component [C] and then the component [A] is added.

Alternatively, these three components may be brought into contact with each other simultaneously.

In the step of contacting these catalyst components or after the completion of the contact, it is also possible that a polymer (polyethylene, polypropylene, etc.) or a solid inorganic oxide (silica, alumina, etc.) coexist or comes into contact. The contact may be carried out in an inert gas (nitrogen, etc.) or an inert hydrocarbon solvent (pentane, hexane, heptane, toluene, xylene, etc.). The contact temperature is from −20° C. to the boiling temperature of the solvent. It is particularly preferable to carry out the contact from room temperature to the boiling point of the solvent. Regarding the amount of each catalyst component, the component [A] is used in an amount of from 0.0001 to 10 mmol preferably from 0.001 to 5 mmol) while the component [C] is used in an amount of from 0.01 to 10,000 mmol (preferably from 0 1 to 100 mmol) each per gram of the component [B]. The atomic ratio of the transition metal in the component [A] to the aluminum in the component [C] is 1:0.01 to 1,000,000, preferably 0.1 to 100,000.

It is desirable that the prepolymerization with the use of ethylene is carried out by supplying ethylene under the contact of the components as described above so as to form 0.01 to 1,000 g (preferably 0.1 to 100 g) of the polymer per gram of the solid catalyst component. The prepolymerization is performed at a temperature of from −50 to 100° C. (preferably from 0 to 100° C.) for 0.1 to 100 hours (preferably 0.1 to 20 hours).

The solid catalyst component thus obtained may be used in the polymerization reaction as such without washing. Alternatively, it may be washed prior to using. In case where the polymerization is carried out in a solvent such as an inert hydrocarbon, the solid catalyst component may be used either as a slurry or as a powder formed by evaporating the solvent to dryness.

(5) Production of ethylene/α-olefin copolymer

The copolymerization of ethylene with α-olefin is carried out by using the solid catalyst component obtained above (preferably the solid catalyst component having been prepolymerized with the use of ethylene). In this step, an organic aluminum compound may be used together, if necessary. As examples of the organic aluminum compound to be used herein, those described above as the compounds usable as the component [C] may be cited. The amount of the organic aluminum compound is selected so as to give a molar ratio of the transition metal in the component [A] to the aluminum in the organic aluminum compound of 1:0 to 10,000.

In the invention, ethylene can be copolymerized with an α-olefin (propylene, butene-1, 3-methylbutene-1, 3-methylpentene-1, 4-methylpentene-1, etc.) by using the solid catalyst for polymerizing olefins as described above.

The polymerization reaction is performed in the presence or absence of a solvent such as an inert hydrocarbon (butane, pentane, hexane, heptane, toluene, cyclohexane, etc.) or a liquefied α-olefin. The polymerization temperature is from −50 to 250° C. while the polymerization pressure is preferably from atmospheric pressure to about 2,000 kgf/cm², though the invention is not restricted thereto. The polymerization system may contain hydrogen as a molecular weight regulator. Preferable examples of the polymerization method include slurry polymerization, gas phase polymerization, high-pressure polymerization and solution polymerization.

The ethylene/α-olefin copolymer according to the invention may further contain, if needed, various additives such as a weathering stabilizer, a heat stabilizer, an antistatic agent, a slippage agent, an antiblocking agent, an anti-fogging agent, a lubricant, a pigment, a nucleating agent, an aging retarder, a hydrochloric acid absorber and an antioxidant, so long as the effects of the invention are not deteriorated thereby.

<Film>

The film according to the invention is made of the above-described ethylene/α-olefin copolymer. The film may be produced by publicly known methods under publicly known conditions without restriction. It is favorable that the film of the invention is produced by blown film extrusion the ethylene/α-olefin copolymer as described above. That is to say, the above-described ethylene/α-olefin copolymer according to the invention is characterized by showing a particularly excellent transparency when it is manufactured by the blown film extrusion process.

In blown film extrusion , general processing conditions may be employed without restriction. For example, the processing can be carried out at the temperature of the resin extruded from a die ranging from 140 to 260° C. (preferably from 180 to 240° C.), at a BUR expressed by the ratio of the bubble size to the die diameter ranging from 1.0 to 4.5 (preferably from 1.5 to 3.5), and at a TUR expressed by the ratio of the take-off speed to the average flow rate extruded from the die ranging from 2.0 to 200 (preferably from 10 to 100).

Needless to say, it is possible to use a gas other than air or a liquid as a refrigerant carrier in the step of blown film extrusion for producing the ethylene/α-olefin copolymer according to the invention. Also, use can be made of special blown film extrusion techniques such as stretching (inflation biaxial co-stretching) extrusion and multistage blown. Moreover, the ethylene/α-olefin copolymer can be extruded into a film by using extrusion techniques other than blown film, for example, sheet extrusion. Furthermore, the ethylene/α-olefin copolymer can be processed into not only a single layer but respective layers in a multilayered extruded film or subjected to extrusion coating.

The thickness of the film (or sheet) product thus obtained is not particularly restricted. Similar to the related ethylene/α-olefin copolymers, the appropriate thickness varies depending on the extrusion method and conditions. In case of blown film extrusion, for example, the thickness ranges from about 5 to 300 μm. In case of flat film extrusion, the thickness of the film (or sheet) may be controlled to about 5 μm to 5 mm.

<Use>

The film made of the ethylene/α-olefin copolymer according to the invention can be used without restriction in the fields wherein ethylene-based copolymers have been employed. For example, it is usable as packing bags, packing films, decorative films and protective films or in the field of sealant.

To further illustrate the invention in greater detail, the following Examples will be given. However, it is to be understood that the invention is not construed as being limited thereto. The definition and measurement methods of the physical data employed in the invention will be illustrated.

(1) FR (Flow Ratio)

FR was determined in accordance with JIS-K6760 by calculating the ratio $I_{10kg}/I_{2.16kg}$, wherein $I_{10kg}$ stands for the melt index measured at 190° C. under a 10 kg load and $I_{2.16kg}$ stands for the melt index measured at 190° C. under a 2.16 kg load.

(2) GPC-MALLS Measurement and Definition of Mc

In the invention, the effect of improving transparency is expressed by using Mc determined by GPC-MALLS measurement. This value Mc is determined by (a) obtaining the data by using the following measurement apparatus, conditions and calibration and (b) processing the thus obtained data.

(a) Measurement of Data

[Apparatus]

GPC: Model 150CV (involving RI detector) manufactured by Waters.

MALLS: Model DAWN DSP (flow cell: F2 cell) manufactured by Wyatt (data processing software: ASTRA Version 4.50 manufactured by Wyatt).

[Conditions]

Columns: three Shodex UT-806M columns manufactured by Showa Denko).

Line filter: Filter Insert Assy WAT088984 manufactured by Waters Corporation.

Solvent: 1,2,4-trichlorobenzene (manufactured by Wako Pure Chemical Industries, HPLC-grade) containing 0.2 w/v% of BHT (butylated hydroxytoluene).

Flow rate: 0.5 ml/min (calibrated with the elution volume of BHT in the sample in practice).

Measurement temperature: 140° C. (injection unit, column unit, detector (RI and DAWN) units).

Injection rate: 0.3 ml.

Sample concentration: 2 mg/ml.

Sample weight: 20 mg.

Sample preparation: dissolving by heating sample solution in an air bath at 140° C. for 3 to 5 hours.

[Calibration]

Use was made of NIST*SRM-1483 as an isotropic scattering substance for calibrating the sensitivity of each MALLS detector.

The delay volumes of MALLS and RI detectors were measured by using standard polystyrene (F10) manufactured by Tosoh.

The refractive index of the solvent was regarded as 1.502, while the Rayleigh ratio was regarded as $3.570 \times 10^{-5}$.

(b) Calculation of Mc

In a chromatogram with the use of Rayleigh ratio obtained by extrapolating GPC-MALLS data thus obtained at a scattering angle of 0°, the chromatographic area ratio Mc (%) of the components having molecular weight of 1,000,000 or more was calculated in the following manner.

The whole region detected as chromatographic peaks in the chromatogram of MALLS at a scattering angle of 90° was selected as the subject of calculation and the molecular weights were calculated by using the data processing software ATRA. The molecular weights were determined by using the injection weight and dn/dc (−0.104 ml/g) from Zimm plot (primary approximation). The Rayleigh ratio $R(0)_i$, extrapolated at a scattering angle of 0°, of each eluting component fractionated by GPC was calculated in accordance with the following formula (1).

$$R(0)_i = Kc_i M_i \quad (1)$$

In the above formula, $c_i$ and $M_i$ respectively stand for the concentration and molecular weight of the eluting component i obtained by the calculation with the use of ASTRA, while K stands for an optical constant calculated in accordance with the following formula (2).

$$K = \{4\pi^2 \times n \times dn/dc\}/\{\lambda^{-4}/NA\} \quad (2)$$

In the above formula:

π: pi=3.14;

b: refractive index of solvent under measuring conditions=1.502;

dn/dc: refractive index concentration gain of sample under measuring conditions=−0.104 [ml/g];

λ: wavelength of light source in vacuo=$632.8 \times 10^{-7}$ [cm]; and

NA: Avogadro's constant=$6.022 \times 10^{23}$ [/mol].

Thus, K is $9.976 \times 10^{-8}$ [cm$^2$·mol/g$^2$].

On the other hand, the elution volume V (1M) at the molecular weight of 1,000,000 was read from the curve obtained by the Zimm plotting of the molecular weight of each component against the elution volume as described above. Then the area ratio of high-molecular weight components (V:1M or more) was calculated in the chromatogram of the elution volume and $R(0)_i$.

(3) CFC Measurement and Definition of W30 and W74

In the invention, the components worsening transparency are defined as W30 (weight fraction (% by weight) of the portion eluted from TREF column below 30° C.) and W74 (weight fraction (% by weight) of the portion eluted from TREF column below 74° C.) in CFC measurement. These values were measured by using the following apparatus under the following conditions. The GPC column was calibrated by using monodisperse polystyrenes (A-2500, A-5000, F-1, F-2, F-4, F-10, F-20, F-40, F-80, F-280) manufactured by Tosoh. Molecular weights were corrected by using the data obtained form the calibration curve in accordance with the following viscosity formula.

$$[\eta] = 0.000108 \times M^{0.723} (\text{PS})$$

$$[\eta] = 0.000392 \times M^{0.733} (\text{PE})$$

The CDC measurement temperatures involved 27 lots, i.e., 0, 10, 20, 30, 40, 45, 49, 52, 55, 58, 61, 64, 67, 70, 73, 76, 79, 82, 85, 88, 91, 94, 97, 100, 102, 120 and 140° C. The weight ratio of the components eluting at 74° C. or below was determined by using a data processor attached to the CFC apparatus (T-150A).

[Apparatus]

CFC: Model T-150A manufactured by Dia Instrument.

Detector: MIRAN·1A Infrared Detector manufactured by FOXBORO (measurement wavelength: 3.42 μm, flow cell: manufactured by KBr, optical path length: 1.5 mm, slit: 2 mm).

[Conditions]

GPC columns: three Shodex UT-806M columns manufactured by Showa Denko).

Solvent: o-dichlorobenzene (manufactured by Wako Pure Chemical Industries, reagent-grade).

Flow rate: 1.0 ml/min.

Measurement temperature: 140° C. (injection unit, column unit and detector unit).

Injection rate: 0.4 ml.

Sample concentration: 3 mg/ml.

Sample preparation: dissolving by heating sample solution in an air bath at 140° C. for 3 to 5 hours.

M Measurement procedure: The TRFE column packing was coated with the sample by cooling to 0° C. at a rate of 1° C./min. After maintaining at 0° C. for 30 minutes, the components eluting at 0° C. were introduced into the GPC column followed by the molecular weight determination. After introducing into the GPC column, the TRFE column temperature was elevated to 10° C. After maintaining at this temperature for 48 minutes, the components eluting at this temperature were introduced into the GPC column. Subsequently, this procedure was repeated at each measurement temperature.

EXAMPLE 1

(1) Magnesium Salt Treatment of clay Mineral 20 kg of a commercially available granulated and classified swelling montmorillonite product ("Benclay SL" manufactured by Mizusawa Kagaku, average particle size: 27 μm) was dispersed in 187 kg of an aqueous solution of magnesium sulfate/sulfuric acid (magnesium sulfate concentration: 6.9% by weight, sulfuric acid concentration: 11.2% by weight) and stirred at 90° C. for 7 hours. Then the dispersion was filtered and washed with desalted water. The solid cake thus obtained was dried at 110° C. for 10 hours. Masses in the dry montmorillonite thus obtained were eliminated by passing a 75 μm-sieve and thus 10 kg of particles passing through the sieve were obtained.

(2) Titanium Salt Treatment of Clay Mineral 364 g of a commercially available aqueous solution of titanium sulfate in sulfuric acid (30% titanium sulfate (IV) solution containing 13% of sulfuric acid, manufactured by Wako Pure Chemical Industries) was dissolved in 516 g of pure water. Next, 75.8 g of the magnesium salt-treated montmorillonite particles obtained in the above (1) were dispersed in the solution and stirred at 90° C. for 3 hours. After filtering and washing with desalted water to give a pH value 3, the moisture-containing solid cake thus obtained was pre-dried at 110° C. for 10 hours. Thus 77.8 g of titanium salt-treated montmorillonite particles having a high fluidity were obtained. These pre-dried montmorillonite particles were further dried at 200° C. under reduced pressure for 2 hours. The Ti atom content in the titanium salt-treated montmorillonite was 1.1% by weight.

(3) Organic Al-Treatment of Titanium Salt-Treated Montmorillonite

Under a nitrogen atmosphere, 50 g of the titanium salt-treated montmorillonite obtained in the above (2) were introduced into a 2 L flask and dispersed in 59 ml of n-heptane to give a slurry. Next, 241 ml of a solution of triethylaluminum in n-heptane (concentration: 0.622 mol/L) was added thereto with stirring at room temperature. After bringing into contact at room temperature for 1 hour, the supernatant was withdrawn and the solid phase was washed with n-heptane.

(4) Preparation of Catalyst and Prepolymerization

Under a nitrogen atmosphere, 3.0 L of n-heptane and a solution of 0.400 mmol (0.197 g) of bis(n-butylcyclopentadienyl)hafnium dichloride in 300 ml of n-heptane were introduced into a 10 L reactor provided with an induction/stirring unit and then the mixture was stirred at 55° C. for 10 minutes. Subsequently, 48.0 mmol (5.48 g) of triethylaluminum was added and stirring was carried out for additional 10 minutes. While maintaining at the same temperature, a slurry of 50 g of the Ti salt-treated montmorillonite particles obtained in the above (3) in 900 ml of n-heptane was introduced into the reactor and stirring was continued for 10 minutes. Then the temperature of the system was elevated to 60° C. and an ethylene gas was introduced thereinto at a speed of 1.3 NL/min for 286 minutes to thereby perform prepolymerization. Next, the supply of ethylene was ceased and the whole contents of the reactor were withdrawn into a reciprocating vacuum dryer having a 15 L tank under a nitrogen atmosphere. Then 5 L of heptane was added to the reactor and the whole contents of the reactor were withdrawn into the dryer. The prepolymerized catalyst slurry transferred into the dryer was allowed to stand and about 5 L of the supernatant was removed. Then, 8.40 mmol (4.18 g) of a solid powder of bis(n-butylcyclopentadienyl)hafnium dichloride was added thereto and dissolved under reciprocating. After reciprocating for 10 minutes, the mixture was heated to 70° C. and dried under reduced pressure to thereby eliminate the solvent. Thus, 378 g of a prepolymerized catalyst powder was collected.

(5) Copolymerization of Ethylene/1-butene

By using the prepolymerized catalyst as described in the above (4), ethylene/1-butene gas phase polymerization was carried out. Namely, 23.3 mg/hr of the solid catalyst component, 100 mg/hr of triisobutylaluminum and 65.7 mg/hr of diethylaluminum ethoxide were intermittently supplied into a continuous gas phase polymerization reactor wherein a mixed gas of ethylene, butene and hydrogen (butene/ethylene=2.3% by mol, hydrogen/ethylene=0.042% by mol) was circulated. The polymerization was performed at 83° C. under a partial ethylene pressure of 18 kg/cm². The average residence time was 3.9 hours. The average polymerization rate of the polyethylene thus formed was 311 g/h. Table 1 shows the fundamental physical properties (MI, FR and density) of the polymer thus obtained.

(6) Blendinig of Additives

To the ethyleine/α-olefin copolymer thus obtained, the following antioxidants and neutralizing agent were added and the resultant mixture was kneaded and granulated by using a uniaxial extruder of 20 mm in bore diameter.
Antioxidants: 1,000 ppm of octadecyl-3-(3,5-t-butyl-4-hydroxyphenyl) propionate (Irganox 1076 manufactured by Ciba Speciality Chemicals); and
700 ppm of tetrakis-(2,4-di-butylphenyl)4,4-biphenylene-diphosphte (PEPQ manufactured by Clariant).
Neutralizing agent: 300 ppm of calcium stearate (Ca-St (B.K) manufactured by Nitto Kasei Kogyo).

(7) Blown Film Extrusion blown film extrusion was carried out by using a uniaxial extruder of 30 mm in bore diameter.
Screw: bore diameter 30 mm, L/D=25, full flight type.
Screw rotary speed: about 27 rpm.
Die: spiral mandrel die with bore diameter of 25 mm, Lip width of 2.0 mm.
Resin temperature: 180° C.
Film size: 78 mm in lay-flat width, 20 μm in thickness.

(8) Evaluation

The transparency of the obtained film was evaluated by measuring haze. The haze of the film was measured in accordance with JIS-K7105 by using a turbidimeter with integrated sphere (manufactured by Toyo Seiki).

Further, the Mn and Mw were measured from the obtained film by GPC and then MW/Mn was determined.

Furthermore, $\overline{Mc}$ and $<\sigma>$ was determined by the "five-point measurement method" of GPC-Malls.

Furthermore, W30 and W74 were determined by CFC.

Table 1 summarizes the evaluation data thus obtained.

EXAMPLE 2

(1) Zirconium Salt Treatment of Clay Mineral 427 g of commercially available zirconium (IV) sulfate tetrahydride (manufactured by Mitsuwa Kagaku) and 125 g of sulfuric acid were dissolved in 900 g of pure water. Next, 200 g of the magnesium salt-treated montmorillonite particles obtained in Example 1-(1) were dispersed therein and stirred at 90° C. for 3 hours. After filtering and washing with desalted water to give a pH value 3, the moisture-containing solid cake thus obtained was pre-dried at 110° C. for 10 hours. Thus 216 g of zirconium salt-treated montmorillonite particles having a high fluidity were obtained. These pre-dried montmorillonite particles were further dried at 200° C. under reduced pressure for 2 hours. The Ar atom content in the zirconium salt-treated montmorillonite was 0.55% by weight.

(2) Organic Al-Treatment of Zirconium Salt-treated Montmorillonite, Preparation of Catalyst and Prepolymerization The procedures of Example 1 (3) and (4) were followed but using the zirconium salt-treated montmorillonite obtained in the above (1) as a substitute for the titanium salt-treated montmorillonite. As a result, 393 g of a prepolymerized catalyst powder was collected.

(3) Copolymerization of Ethylene/1-butene

By using the prepolymerized catalyst as described in the above (2), ethylene/1-butene as phase polymerization was carried out. Namely, 31.0 mg/hr of the solid catalyst component, 100 mg/hr of triisobutylaluminum and 65.7 mg/hr of diethylaluminum ethoxide were intermittently supplied into a continuous gas phase polymerization reactor wherein a mixed gas of ethylene, butene and hydrogen (butene/ethylene=2.3% by mol, hydrogen/ethylene=0.042% by mol) was circulated. The polymerization was performed at 83° C. under a partial ethylene pressure of 18 kg/cm$^2$. The average residence time was 3.9 hours. The average polymerization rate of the polyethylene thus formed was 306 g/h. Table 1 shows the fundamental physical properties of the polymer thus obtained.

The obtained copolymer was blended with the additives, processed into a film and then evaluated as in Example 1. Table 1 shows the results.

EXAMPLE 3

By using the prepolymerized catalyst obtained in Example 1(4), ethylene/1-butene gas phase polymerization was carried out as in Example 1(5) but the mixed gas was composed of butene/ethylene=2.3% by mol and hydrogen/ethylene=0.033% by mol and 42.9 mg/hr of the solid catalyst component, 100 mg/hr of triisobutylaluminum and 65.7 mg/hr of diethylaluminum ethoxide were intermittently supplied. The polymerization was performed at 83° C. under a partial ethylene pressure of 18 kg/cm$^2$. The average residence time was 4.2 hours. The average polymerization rate of the polyethylene thus formed was 289 g/h. Table 1 shows the fundamental physical properties of the polymer thus obtained.

The obtained copolymer was blended with the additives, processed into a film and then evaluated as in Example 1. Table 1 shows the results.

EXAMPLE 4

Ethylene/1-butene gas phase polymerization was carried out as in Example 3 but the mixed gas was composed of butene/ethylene=2.3% by mol and hydrogen/ethylene =0.050% by mol and 26.4 mg/hr of the solid catalyst component, 100 mg/hr of triisobutylaluminum and 65.7 mg/hr of diethylaluminum ethoxide were intermittently supplied. The polymerization was performed at 83° C. under a partial ethylene pressure of 18 kg/cm$^2$. The average residence time was 3.6 hours. The average polymerization rate of the polyethylene thus formed was 332 g/h. Table 1 shows the fundamental physical properties of the polymer thus obtained.

The obtained copolymer was blended with the additives, processed into a film and then evaluated as in Example 1. Table 1 shows the results.

EXAMPLE 5

(1) Acid Treatment of Clay Mineral 37 kg of a commercially available granulated and classified swelling montmorillonite product was dispersed in 148 kg of a 25% aqueous solution of sulfuric acid. Then the dispersion was filtered and washed with desalted water.

(2) Salt Treatment of Clay Mineral

In 236 g of a commercially available titanyl sulfate (manufactured by Sakai Kagaku Kogyo, TiO$_2$ content 7.5%, SO$_4$ content 25.6%), the sulfuric acid-treated montmorillonite cake obtained in the above (1) was dispersed as a whole and stirred at 30° C. for 3 hours. After filtering and washing with desalted water to give a pH value 3.5, the moisture-containing solid cake thus obtained was pre-dried at 110° C. for 10 hours to give titanium salt-treated monitmorillonite. The pre-dried montmorillonite particles were passed through a 150 μm-sieve and particles passing through the sieve were continuously dried by using a rotary kiln at 200° C. under a counter nitrogen gas flow (nitrogen flow rate 49 Nm$^3$/h) stream at a speed of 3 kg/h (residence time 10 minutes) and then collected under the dry nitrogen atmosphere.

(3) Organic Al-Treatment of Salt-Treated Montmorillonite

Under a nitrogen atmosphere, 400 g of the dry montmorillonite particles obtained in the above (2) were introduced into a 10 L reactor provided with an induction/stirring unit and dispersed in 0.44 L of n-heptane. The temperature of this slurry dispersion was adjusted to 30° C. Subsequently, 1.96 L of a solution of triethylaluminum in n-heptane (concentration 0.622 mol/L) was added and the temperature was elevated to 40° C. After carrying out the reaction for 1 hour while sustaining this temperature, the temperature was lowered to 30° C. and 7.5 L of n-heptane was added. At this point, the total volume of the prepolymerized catalyst slurry was 9.9 L. After stirring at 30° C. for 5 minutes, stirring was ceased and the mixture was allowed to stand for sedimentation. 6.1 L of the supernatant was withdrawn. The washing ratio at this point is calculated as (9.9 L–6.1 L)/9.9 L=1/ 2.61. After adding 6.5 L of n-heptane again, the resultant mixture was stirred at 30° C. for 5 minutes and then allowed to stand for sedimentation for 15 minutes. Then the supernatant was withdrawn and this procedure was repeated thrice so that the product of the washing ratios of these steps attained 1/54.

(4) Preparation of Catalyst and Prepolymerization

Under a nitrogen atmosphere, 2.4 L of n-heptane and a slurry of 95.4 g of the organic Al-treated montmorillonite particles obtained in the above (3) in 900 ml of n-heptane were introduced into a 10 L reactor provided with an induction/stirring unit and the temperature was adjusted to 30° C. While sustaining this temperature, a dispersion of 24.0 mmol (11.8 g) of bis(n-butylcyclopentadienyl)hafnium dichloride in 900 ml of n-heptane was added thereto and stirring was continued for 10 minutes. Subsequently, 96.0 mmol (10.96 g) of triethylaluminum was added and then the temperature in the system was elevated to 75° C. Stirring was continued for additional 10 minutes. After adjusting the temperature in the system to 80° C., 10.0 NL/min of ethylene gas was supplied for 76 minutes and prepolymerization was carried out. Then the supply of ethylene was ceased and the ethylene gas in the reactor was replaced with nitrogen.

(5) Washing of Prepolymerized Catalyst

The prepolymerized catalyst obtained in the above (4) was cooled and washed with n-heptane thrice at 60° C. so that the product of the washing ratios of the steps attained 1/56.

(6) Drying of Prepolymerized Catalyst

The whole prepolymerized catalyst washed in the above (5) was placed under a nitrogen atmosphere and withdrawn into a 15 L reciprocating vacuum dryer provided with a steam jacket for receiving conductive heat. After adding 4.0 L of heptane to the reactor, the whole contents remaining in the reactor were withdrawn into the dryer. After transporting into the dryer, the prepolymerized catalyst was allowed to stand and about 5 L of the supernatant was removed. Then the residue was dried under reduced pressure while heating to 70° C. to thereby eliminate the solvent. As a result, 973 g of a prepolymerized catalyst powder was collected.

(7) Copolymerization of Ethylene/1-butene

By using the prepolymerized catalyst obtained in the above (6), ethylene/1-butene gas phase polymerization was carried out as in Example 1(5) but the mixed gas was composed of butene/ethylene=6.0% by mol and hydrogen/ethylene=0.050% by mol and 87.2 mg/hr of the solid catalyst component, 20 mg/hr of triisobutylaluminum and 68 mg/hr of diethylaluminum ethoxide were intermittently supplied. The polymerization was performed at 90° C. under a partial ethylene pressure of 18 kg/cm². The average residence time was 4.2 hours. The average polymerization rate of the polyethylene thus formed was 283 g/h. Table 1 shows the fundamental physical properties of the polymer thus obtained.

The obtained copolymer was blended with the additives, processed into a film and then evaluated as in Example 1. Table 1 shows the results.

EXAMPLE 6

(1) Organic Al-Treatment of Salt-Treated Montmorillonite

Under a nitrogen atmosphere, 400 g of the dry montmorillonite particles obtained in Example 5 (2) were introduced into a 3 L flask and dispersed in 0.47 L of n-heptane to give a slurry. Then 1.93 L of a solution (concentration 0.622 mol/L) of triethylaluminum in n-heptane was added thereto under stirring at room temperature. After reacting for 1 hour, the mixture was allowed to stand for sedimentation and 1.6 L of the supernatant was withdrawn. Next, 1.60 L of n-heptane was added and the mixture was stirred for 10 minutes. After allowing to stand for sedimentation, 1.60 L of the supernatant was withdrawn. This washing procedure was repeated thrice.

(2) Preparation of Catalyst and Prepolymerization

Under a nitrogen atmosphere, 1.3 L of n-heptane and a slurry of 24.0 mmol (11.8 g) of bis(n-butylcyclopentadienyl) hafnium dichloride dispersed in 2.0 L of n-heptane were added to a 10 L reactor provided with an induction/stirring unit and the resultant mixture was stirred at 75° C. for 10 minutes. Subsequently, 96.0 mmol (10.96 g) of triethylaluminum was added and stirring was continued for additional 10 minutes. While sustaining at the same temperature, a slurry of 100 g of the organic Al-treated montmorillonite particle obtained in the above (3) in 900 ml of n-heptane was introduced into the reactor and stirred for 10 minutes. After adjusting the temperature in the reaction system to 80° C., 10.0 NL/min of ethylene gas was supplied for 75 minutes and prepolymerization was carried out. Then the supply of ethylene was ceased and the ethylene gas in the reactor was replaced with nitrogen.

(3) Washing and Drying of Prepolymerized Catalyst

The procedures of Examples 5 (5) and (6) were followed. Namely, the prepolymerized catalyst slurry obtained in the above (2) was cooled and washed with n-heptane thrice at 60° C. so that the product of the washing ratios of the steps attained 1/18. After drying, 965 g of a prepolymerized catalyst powder was collected.

(4) Copolymerization of Ethylene/1-butene

By using the prepolymerized catalyst powder obtained in the above (3), ethylene/1-butene gas phase polymerization was carried out as in Example 1(5) but the mixed gas was composed of butene/ethylene=2.3% by mol and hydrogen/ethylene=0.050% by mol and 45.6 mg/hr of the solid catalyst component, 20 mg/hr of triisobutylaluminum and 68 mg/hr of diethylaluminum ethoxide were intermittently supplied. The polymerization was performed at 90° C. under a partial ethylene pressure of 18 kg/cm². The average residence time was 4.9 hours. The average polymerization rate of the polyethylene thus formed was 244 g/h. Table 1 shows the fundamental physical properties of the polymer thus obtained.

The obtained copolymer was blended with the additives, processed into a film and then evaluated as in Example 1. Table 1 shows the results.

EXAMPLE 7

(1) Preparation of Prepolymerized Catalyst

Under a nitrogen atmosphere, 5.05 Kg of dry montmorillonite particles produced as in Example 5 (1) and (2) and 392 L of n-heptane were introduced into a 0.92 m³ reactor provided with an induction/stirring unit and the temperature was adjusted to 11° C. While sustaining at this temperature, 1.20 mol (591 g) of bis(n-butylcyclopentadienyl)hafnium dichloride was added thereto and the obtained mixture was stirred for 15 minutes. Subsequently, 4.90 mol (560 g) of triethylaluminum was added while sustaining at this temperature and stirring was continued for additional 20 minutes. Then the temperature in the system was elevated to 80° C. over 60 minutes and ethylene gas was supplied for 2 hours and prepolymerization was carried out. During this period, the ethylene gas was supplied at a rate of 36 kg/h for the initial 15 minutes and then at 17 kg/h. The supply of ethylene was ceased and the ethylene gas in the reactor was replaced with nitrogen. This prepolymerized catalyst powder was washed and dried as in Example 5 (5) and (6) and thus 43.8 kg of a prepolymerized catalyst powder was collected. However, washing was carried out at 30° C., the washing ratio was 1/127 and n-heptane containing 1 mmol/L of TEA was employed in the washing.

(2) Copolymerization of Ethylene/1-hexene

By using the prepolymerized catalyst powder obtained in the above (1), ethylene/1-hexene gas phase polymerization was carried. Namely, 103.6 mg/hr of the solid catalyst component, 100 mg/hr of triisobutylaluminum and 68 mg/hr of diethylaluminum ethoxide were intermittently supplied into a continuous gas phase polymerization reactor wherein a mixed gas of ethylene, hexene and hydrogen (hexene/ethylene=2.0% by mol, hydrogen/ethylene=0.041% by mol) was circulated. The polymerization was performed at 90° C. under a partial ethylene pressure of 18 kg/cm$^2$. The average residence time was 3.9 hours. The average polymerization rate of the polyethylene thus formed was 311 g/h. Table 1 shows the fundamental physical properties of the polymer thus obtained.

The obtained copolymer was blended with the additives, processed into a film and then evaluated as in Example 1. Table 1 shows the results.

EXAMPLE 8

(1) Preparation of Prepolymerized Catalyst

A prepolymerization catalyst was prepared as in Example 7 (1). Namely, under a nitrogen atmosphere, 5.00 Kg of dry montmorillonite particles produced as in Example 5 (1) and (2) and 392 L of n-heptane were introduced into a 0.92 m$^3$ reactor provided with an induction/stirring unit and the temperature was adjusted to 13° C. While sustaining at this temperature, 1.20 mol (590 g) of bis(n-butylcyclopentadienyl)hafnium dichloride was added thereto and the obtained mixture was stirred for 15 minutes. Subsequently, 4.90 mol (560 g) of triethylaluminum was added while sustaining at this temperature and stirring was continued for additional 20 minutes. Then the temperature in the system was elevated to 80° C. over 51 minutes and prepolymerization, washing and drying were performed. Thus 43.1 kg of a prepolymerized catalyst powder was collected.

(2) Copolymerization of Ethylene/1-hexene

By using the prepolymerized catalyst powder obtained in the above (1), ethylene/1-hexene gas phase polymerization was carried as in Example 7 (2). Namely, 69.7 mg/hr of the solid catalyst component, 100 mg/hr of triisobutylaluminum and 68 mg/hr of diethylaluminum ethoxide were intermittently supplied into a continuous gas phase polymerization reactor wherein a mixed gas of ethylene, hexene and hydrogen (hexene/ethylene=1.8% by mol, hydrogen/ethylene=0.041% by mol) was circulated. The polymerization was performed at 90° C. under a partial ethylene pressure of 18 kg/cm$^2$. The average residence time was 3.5 hours. The average polymerization rate of the polyethylene thus formed was 347 g/h. Table 1 shows the fundamental physical properties of the polymer thus obtained.

EXAMPLE 9

(1) Copolymerization of Ethylene/1-hexene

By using the prepolymerized catalyst powder obtained in Example 6 (5), ethylene/1-hexene gas phase polymerization was carried as in Example 7 (2) but the mixed gas as composed of hexene/ethylene=1.4% by mol and hydrogen/ethylene=0.038% by mol and 33.2 mg/hr of the solid catalyst component, 22 mg/hr of triisobutylaluminum and 75 mg/hr of diethylaluminum ethoxide were intermittently supplied. The polymerization was performed at 83° C. under a partial ethylene pressure of 18 kg/cm$^2$. The average residence time was 5.5 hours. The average polymerization rate of the polyethylene thus formed was 219 g/h. Table 1 shows the fundamental physical properties of the polymer thus obtained.

The obtained copolymer was blended with the additives, processed into a film and then evaluated as in Example 1. Table 1 shows the results.

EXAMPLE 10

(1) Acid Treatment of Clay Mineral 50 g of a commercially available granulated and classified swelling montmorillonite product was dispersed in 239 g of 14% sulfuric acid and stirred at 90° C. for 3 hours. After filtering and washing with desalted water to give a pH value 3.5, the moisture-containing solid cake thus obtained was pre-dried at 110° C. for 10 hours to give acid-treated montmorillonite. This pre-dried montmorillonite was further dried at 200° C. under reduced pressure for 2 hours.

(2) Preparation of Catalyst and Prepolymerization

Under a nitrogen atmosphere, 291 ml of n-heptane and a slurry of 10 g the dry montmorillonite particles obtained in the above (1) in 100 ml of n-heptane were added to a 1 L reactor provided with an induction/stirring, unit. While sustaining the system at 20° C., 2.4 mmol (1.18 g) of bis(n-butylcyclopentadienyl)hafnium dichloride dispersed in 393 ml of n-heptane was added thereto and stirred for 5 minutes. While sustaining at the same temperature, 9.6 mmol (1.096 g) of triethylaluminum was added and the temperature of the system was elevated to 78° C. Immediately thereafter, 1.0 NL/min of ethylene gas was supplied for 56 minutes and prepolymerization was carried out. Then the supply of ethylene was ceased and the ethylene gas in the reactor was replaced with nitrogen.

(3) Washing and Drying of Prepolymerized Catalyst

The prepolymerized catalyst slurry obtained in the above (2) was transferred into a flask and washed with n-heptane at room temperature until the washing ratio attained 1/73. Then the system was heated to 70° C. and the solvent was distilled off under reduced pressure. Thus, 87.5 g of a prepolymerized catalyst powder was collected.

(4) Copolymerization of Ethylene/1-hexene

By using the prepolymerized catalyst powder obtained in the above (3), ethylene/1-hexene gas phase polymerization was carried out as in Example 7(2) but the mixed gas was composed of hexene/ethylene=1.8% by mol and hydrogen/ethylene=0.041% by mol and 51.3 mg/hr of the solid catalyst component, 100 mg/hr of triisobutylaluminum and 68 mg/hr of diethylaluminum ethoxide were intermittently supplied. The polymerization was performed at 90° C. under a partial ethylene pressure of 18 kg/cm$^2$. The average residence time was 3.1 hours. The average polymerization rate of the polyethylene thus formed was 384 g/h. Table 1 shows the fundamental physical properties of the polymer thus obtained.

The obtained copolymer was blended with the additives, processed into a film and then evaluated as in Example 1. Table 1 shows the results.

EXAMPLE 11

(1) Acid Treatment of Clay Mineral 20 kg of a commercially available granulated and classified swelling montmorillonite product was dispersed in 380 kg of 40% sulfuric acid and stirred at 90° C. for 5 hours. After filtering and washing with desalted water to give a pH value 3.5, the moisture-containing solid cake thus obtained was pre-dried at 110° C. for 10 hours to give acid-treated montmorillonite. This pre-dried montmorillonite was passed through a 150-mesh sieve and particles passing through the sieve were further dried at 200° C. under educed pressure for 2 hours.

(2) Preparation of Catalyst and Prepolymerization

Under a nitrogen atmosphere, 291 ml of n-heptane and a slurry of 10 g the dry montmorillonite particles obtained in the above (1) in 100 ml of n-heptane were added to a 1 L reactor provided with an induction/stirring unit. While sustaining the system at 30° C., 2.4 mmol (1.18 g) of bis(n-butylcyclopentadienyl)hafnium dichloride dispersed in 393 ml of n-heptane was added thereto and stirred for 10 minutes. While sustaining at the same temperature, 9.6 mmol (1.096 g) of triethylaluminum was added and the temperature of the system was elevated to 78° C. Immediately thereafter, 1.0 NL/min of ethylene gas was supplied for 57 minutes and prepolymerization was carried out. Then the supply of ethylene was ceased and the ethylene gas in the reactor was replaced with nitrogen.

(3) Washing and Drying of Prepolymerized Catalyst

The prepolymerized catalyst slurry obtained in the above (2) was transferred into a flask and washed with n-heptane at 60° C. until the washing ratio attained 1/15. Then the system was heated to 70° C. and the solvent was distilled off under reduced pressure. Thus, 76.4 g of a prepolymerized catalyst powder was collected.

(4) Copolymerization of Ethylene/1-hexene

By using the prepolymerized catalyst powder obtained in the above (3), ethylene/1-hexene gas phase polymerization was carried out as in Example 6(2) but the mixed gas was composed of hexene/ethylene=2.0% by mol and hydrogen/ethylene=0.041% by mol and 95.0 mg/hr of the solid catalyst component, 100 mg/hr of triisobutylaluminum and 68 mg/hr of diethylaluminum ethoxide were intermittently supplied. The polymerization was performed at 90° C. under a partial ethylene pressure of 18 kg/cm². The average residence time was 4.0 hours. The average polymerization rate of the polyethylene thus formed was 299 g/h. Table 1 shows the fundamental physical properties of the polymer thus obtained.

The obtained copolymer was blended with the additives, processed into a film and then evaluated as in Example 1. Table 1 shows the results.

COMPARATIVE EXAMPLE 1

A commercially available LIDPE EXACT 3009 (manufactured by Exxon Chemical) was processed into a film under the same conditions as in Example 1. Table 1 shows the evaluation data of this film.

COMPARATIVE EXAMPLE 2

(1) Chemical Treatment of Clay Mineral 1 kg of a synthetic mica (ME-100 manufactured by Corp Chemical) was dispersed in 3.2 kg of desalted water containing 0.2 kg of zinc sulfate heptahydride dissolved therein and the dispersion was stirred at room temperature for 1 hour followed by filtration. After washing with desalted water, the concentration of solid matters was adjusted to 25% and the slurry was introduced into a spray-dryer to give spherical particles. These particles were further dried at 200° C. for 2 hours under reduced pressure.

(2) Preparation of Catalyst and Prepolymerization 3.22 L of n-heptane and 121 g of the synthetic mica particles obtained in the above (1) were introduced into a 10 L reactor provided with an induction/stirring unit. Next, a solution of 9.68 mmol of bis(n-butylcyclopentadienyl) zirconium chloride dissolved in 813 ml of toluene was added thereto and the resultant mixture was stirred at 25° C. for 10 minutes. Subsequently, 26.5 mmol of triethylaluminum was added and the temperature of the system was elevated to 80° C. After 10 minutes, ethylene gas was introduced into the system and the reaction was performed for 1.0 hours. During this period, 277 g of polyethylene was formed.

(3) Copolymerization of Ethylene/1-butene

By using the prepolymerized catalyst obtained in the above (2), ethylene/1-butene gas phase polymerization was carried out. Namely, 16.1 mg/hr of the solid catalyst component and 100 mg/hr of triethylaluminum were intermittently supplied into a continuous gas phase polymerization reactor wherein a mixed gas of ethylene and butene (butene/ethylene=7.0% by mol, hydrogen/ethyleine=0.04% by mol) was circulated. The polymerization was performed at 88° C. under a partial ethylene pressure of 18 kg/cm². The average residence time was 4.5 hours. The average polymerization rate of the polyethylene thus formed was 268 g/h. Table 1 shows the fundamental physical properties of the polymer thus obtained.

The obtained copolymer was blended with the additives, processed into a film and then evaluated as in Example 1. Table 1 shows the results.

COMPARATIVE EXAMPLE 3

(1) Chemical Treatment of Clay Mineral 8 kg of commercially available montmorillonite was ground with a rotary ball mill and dispersed in 50 L of desalted water containing 10 kg of magnesium chloride dissolved therein. After stirring at 80° C. for 1 hour, the solid component thus obtained was washed with water and dispersed in 56 L of a 8.2% aqueous solution of hydrochloric acid. Then it was stirred at 90° C. for 2 hours and washed with desalted water. The solid concentration of the aqueous slurry of 4.6 kg of the montmorillonite thus chemically treated was adjusted to 15.2% and then the slurry was granulated with a spray-dryer to give spherical particles. These particles were further dried at 200° C. for 2 hours under reduced pressure.

(2) Preparation of Catalyst and Prepolymerization 150 g of the montmorillonite particles obtained in the above (1) and 177 ml of toluene were introduced into a 1 L flask. Next, 723 ml of a solution of triethylaluminum (450 mmol) in heptane was added thereto at room temperature. After stirring for 2 hours, the supernatant was withdrawn and the solid phase was washed with toluene. Then toluene was further added to give a total volume of 1 L. This slurry was transferred into a 10 L reactor provided with an induction/stirring unit and 2.0 L of n-heptane was added thereto. Then a solution of 12.0 mmol of bis(n-butylcyclopentadienyl)zirconium dichloride dissolved in 600 ml of toluene was added thereto and the mixture was stirred at 25° C. for 60 minutes. Subsequently, 33.0 mmol of triethylaluminum was added and the temperature of the system was elevated to 80° C. After 10 minutes, ethylene gas was introduced into the system and the reaction was performed for 1.0 hours. During this period, 555 g of polyethylene was formed.

(3) Copolymerization of Ethylene/1-butene

By using the prepolymerized catalyst obtained in the above (2), ethylene/1-butene gas phase polymerization was carried out. Namely, 34.5 mg/hr of the solid catalyst component and 100 mg/hr of triethylaluminum were intermittently supplied into a continuous gas phase polymerization reactor wherein a mixed gas of ethylene and butene (butene/ethylene 7.0% by mol, hydrogen/ethylene=0.04% by mol) was circulated. The polymerization was performed at 80° C. under a partial ethylene pressure of 18 kg/cm$^2$. The average residence time was 4.4 hours. The average polymerization rate of the polyethylene thus formed was 271 g/h. Table 1 shows the fundamental physical properties of the polymer thus obtained.

The obtained copolymer was blended with the additives, processed into a film and then evaluated as in Example 1. Table 1 shows the results.

COMPARATIVE EXAMPLE 4

(1) Chemical Treatment of Clay Mineral 30.0 kg of a synthetic mica (Somasifu, ME-100 manufactured by Corp Chemical) was dispersed in 105.0 kg of desalted water containing 15.0 kg of zinc sulfate heptahydride dissolved therein and the dispersion was stirred for 18 hours, followed by filtration and washing with desalted water. 4.8 Kg of 9 hydration product of chromium (III) nitrate was dissolved in 7.5 Kg of desalted water, followed by stirring for 18 hours at room temperature. Here, it was adjusted so that the slurry concentration was 20.0 wt %. After filtration and washing with desalted water, the concentration of solid matters was adjusted to 25%. Then, synthetic smectite (SWN, Corp Chemical) was added thereto so that the amount was 10 wt % based on the total solid content in the slurry. After the synthetic smectite was dispersed sufficiently, the slurry was introduced into a spray-dryer to dry and give spherical particles. These particles were further dried at 200° C. for 2 hours under reduced pressure.

(2) Preparation of Catalyst and Prepolymerization 2.1 L of n-heptane and a solution in which 0.40 mmol of bis(n-butylcyclopentadienyl)hafnium chloride dissolved in 300 ml of heptane were introduced into a 10 L reactor provided with an induction/stirring unit. Next, a slurry in which 50 g of the sythetic mica particles obtained in the above (1) was dispersed in 0.9 L of heptane was introduced into the reactor, followed by stirring for 10 minutes. Subsequently, 48 mmol of triethyl aluminium was added to make a system temperature to 60° C. After 10 minutes, ethylene gas was introduced into the system and the reaction was performed for 4.75 hours. The supply of ethylene was stopped and all the content in the reactor was taken out to 15-L tank type vibration type reduced-pressure dryer under a nitrogen atmosphere. 5L of heptane was added to the reactor, and all the remaining content in the reactor was taken out to the dryer. The prepolymerization catalyst slurry transferred to the dryer was subjected to stand still and the supernatant fluid (about 5 L) was removed. Then, 5.60 mmol (2.79 g) of solid powder of bis(n-butylcyclopentadienyl) hafnium chloride was added, and dissolved with vibration. After 10-minute vibration, the solvent was removed by reduced-pressure drying while heating at 70° C. As a result, 346 g of the prepolymerization catalyst powder was recovered.

(3) Copolymerization of Ethylene/1-butene

By using the prepolymerized catalyst obtained in the above (2), ethylene/1-butene gas phase polymerization was carried out. Namely, 17.4 mg/hr of the solid catalyst component, 100 mg/hr of triisobutylaluminum and 65.7 mg/hr of triethylaluminum were intermittently supplied into a continuous gas phase polymerization reactor wherein a mixed gas of ethylene and butene (butene/ethylene=2.3% by mol, hydrogen/ethylene=0.05% by mol) was circulated. The polymerization was performed at 83° C. under a partial ethylene pressure of 18 kg/cm$^2$. The average residence time was 3.6 hours. The average polymerization rate of the polyethylene thus formed was 335 g/h. Table 1 shows the fundamental physical properties of the polymer thus obtained and the film evaluation result.

COMPARATIVE EXAMPLE 5

(1) Chemical Treatment of Clay Mineral 30.0 kg of a synthetic mica (Somasifu, ME-100 manufactured by Corp Chemical) was dispersed in 105.0 kg of desalted water containing 15.0 kg of zinc sulfate heptahydride dissolved therein and the dispersion was stirred for 18 hours, followed by filtration and washing with desalted water. 4.8 Kg of 9 hydration product of chromium (III) nitrate was dissolved in 7.5 Kg of desalted water, followed by stirring for 18 hours at room temperature. Here, it was adjusted so that the slurry concentration was 20.0 wt %. After filtration and washing with desalted water, the concentration of solid matters was adjusted to 25%. Then, synthetic smectite (SWN, Corp Chemical) was added thereto so that the amount was 10 wt % based on the total solid content in the slurry. After the synthetic smectite was dispersed sufficiently, the slurry was introduced into a spray-dryer to dry and give spherical particles. These particles were further dried at 200° C. for 2 hours under reduced pressure.

(2) Preparation of Catalyst and Prepolymerization

The same preparation of catalyst and prepolymerization as in Comparative Example 4 (2) were carried out except that the synthetic mica particles obtained in the above (1) was used, and 372 g of prepolymerization catalyst powder was recovered.

(3) Copolymerization of Ethylene/1-butene

By using the prepolymerized catalyst obtained in the above (2), ethylene/1-butene gas phase polymerization was carried out in the same manner as in Comparative Example 4 (3). 14.6 mg/hr of the solid catalyst component and 100 mg/hr of triethylaluminum were intermittently supplied into the reactor. The polymerization was performed at 83° C. under a partial ethylene pressure of 18 kg/cm². The average residence time was 3.7 hours. The average polymerization rate of the polyethylene thus formed was 322 g/h. Table 1 shows the fundamental physical properties of the polymer thus obtained and the film evaluation result.

COMPARATIVE EXAMPLE 6

A commercially available LIDPE FM1570 (manufactured by Dow Chemical) was molded into a film under the same conditions as in Example 1. Table 1 shows the evaluation data of this film.

COMPARATIVE EXAMPLE 7

A commercially available LIDPE HF1030 (manufactured by Dow Chemical) was processed into a film under the same conditions as in Example 1. Table 1 shows the evaluation data of this film.

COMPARATIVE EXAMPLE 8

A commercially available Ultzex 1520L (manufactured by Mitsui Petroleum Industries) was processed into a film under the same conditions as in Example 1. Table 1 shows the evaluation data of this film.

COMPARATIVE EXAMPLE 9

A commercially available Ultzex 2021 (manufactured by Mitsui Petroleum Industries) was processed into a film under the same conditions as in Example 1. Table 1 shows the evaluation data of this film.

When the ethylene/α-olefin copolymers according to the invention are processed into films by, in particular, blown film extrusion, it is possible to obtain films which are excellent in transparency, mechanical properties such as modulus and strength, processing properties and blocking resistance.

We claim:

1. An ethylene/α-olefin copolymer which is a copolymer of ethylene with an α-olefin having 3 to 20 carbon atoms; wherein the ethylene/α-olefin copolymer satisfies the following physical properties (a) to (d):
   (a) having a density of 0.900 to 0.965 g/cm³;
   (b) having a melt index, MI, at 190° C., under a 2.16 kg load, of 0.01 to 100 g/10 min;
   (c) in a chromatogram using a Rayleigh ratio obtained by extrapolating GPC-MALLS data at a scattering angle of 0°, showing an average value of Mc, $\overline{Mc}$, obtained by a five-point measurement method, of 0.5% or more and a standard deviation <σ> of an average of 35% or less;
   wherein Mc stands for a chromatographic area ratio of components having a molecular weight of 1,000,000 or more calculated on the basis of said five-point measurement; and
   (d) having a weight fraction, W30, of the portion eluted below 30° C. in a CFC measurement of 1% by weight or less.

2. The ethylene/α-olefin copolymer as claimed in claim 1, which further satisfies the following requirement (e):
   (e) having a flow ratio: $FR(=I_{10kg}/I_{2.16kg})$ of 7.0 or less, wherein $I_{10kg}$ stands for the melt index measured at 190° C. under a 10 kg load and $I_{2.16kg}$ stands for the melt index measured at 190° C. under a 2.16 kg load.

3. The ethylene/α-olefin copolymer as claimed in claim 1, which further satisfies the following requirement (f):
   (f) having a ratio Mw/Mn of 1.5 to 3.5, wherein Mw stands for the weight-average molecular weight and Mn stands for the number-average molecular weight obtained by GPC measurement.

4. The ethylene/α-olefin copolymer as claimed in claim 2, which further satisfies the following requirement (f):
   (f) having a ratio Mw/Mn of 1.5 to 3.5, wherein Mw stands for the weight-average molecular weight obtained by GPO measurement and Mn stands for the number-average molecular weight.

5. The ethylene/α-olefin copolymer as claimed in any of claims 1 to 3, which has a density of 0.918 (g/cm³) or less.

6. The ethylene/α-olefin copolymer as claimed in any of claims 1 to 4, which has a density of 0.918 (g/cm³) or less.

7. The ethylene/α-olefin copolymer as claimed in claim 1, which has a density of 0.918 (g/cm³) or more and further satisfies the following requirement (g):

TABLE 1

|  | Fundamental index | | | GPC | | | GPC-Malls data | | CFC eluting component ratio | | |
| --- | --- | --- | --- | --- | --- | --- | --- | --- | --- | --- | --- |
|  | M1 | FR | Density | Mn | Mw | Mw/Mn | Mc | <σ> | W30(<30) | W74(<74) | Haze |
| Ex. 1 | 1.59 | 6.18 | 0.9248 | 37600 | 97900 | 2.6 | 6.7 | 8.1 | 0.0 | 3.4 | 1.4 |
| Ex. 2 | 1.56 | 5.98 | 0.9254 | 39800 | 102100 | 2.57 | 12.1 | 17.1 | 0.0 | 2.8 | 1.5 |
| Ex. 3 | 0.78 | 6.41 | 0.9231 | 44600 | 125200 | 2.81 | 8.4 | 22.7 | 0.0 | 6.4 | 2.8 |
| Ex. 4 | 2.71 | 6.13 | 0.9253 | 34900 | 85300 | 2.44 | 7.3 | 18.6 | 0.0 | 12.2 | 2.1 |
| Ex. 5 | 0.52 | 6 | 0.9139 | 47300 | 137500 | 2.91 | 5.0 | 15.3 | 0.4 | 73.5 | 1.2 |
| Ex. 6 | 1.7 | 6.01 | 0.9278 | 34300 | 93600 | 2.73 | 3.2 | 19.9 | 0.0 | 12.0 | 3.9 |
| Ex. 7 | 1.56 | 6.17 | 0.9221 | 34300 | 93600 | 2.73 | 5.8 | 7.3 | 0.0 | 15.1 | 1.9 |
| Ex. 8 | 2.28 | 6.54 | 0.9288 | 29200 | 84600 | 2.9 | 6.7 | 31.5 | 0.0 | 8.5 | 2.5 |
| Ex. 9 | 3.35 | 6.72 | 0.9336 | 25700 | 79600 | 3.1 | 6.9 | 8.4 | 0.0 | 9.7 | 2.4 |
| Ex. 10 | 1.85 | 6.2 | 0.9255 | 34600 | 95500 | 2.76 | 3.3 | 15.8 | 0.0 | 13.1 | 3.7 |
| Ex. 11 | 2.14 | 6.61 | 0.9298 | 30500 | 87800 | 2.9 | 8.2 | 15.8 | 0.0 | 12.5 | 2.8 |
| C.Ex. 1 | 1.6 | 5.67 | 0.924 | 31100 | 86300 | 2.77 | 0.0 | — | 0.0 | 4.0 | 17.6 |
| C.Ex. 2 | 1.54 | 5.55 | 0.92 | 4255.1 | 96600 | 2.27 | 0.1 | — | 0.0 | 29.6 | 19 |
| C.Ex. 3 | 3.34 | 5.68 | 0.922 | 35000 | 73800 | 2.17 | 0.2 | — | 0.0 | 34.3 | 18 |
| C.Ex. 4 | 1.87 | 6.34 | 0.9234 | 34300 | 96500 | 2.81 | 2.1 | 37.3 | 0.0 | 13.5 | 7.4 |
| C.Ex. 5 | 1.53 | 6.02 | 0.9226 | 43200 | 96000 | 2.22 | 1.3 | 39.3 | 0.0 | 16.3 | 7.1 |
| C.Ex. 6 | 0.89 | 10.8 | 0.9168 | 33000 | 81200 | 2.46 | 0.0 | — | 0.0 | 54.5 | 9.1 |
| C.Ex. 7 | 1.95 | 9.85 | 0.9385 | 30400 | 69600 | 2.29 | 0.0 | — | 0.0 | 2.0 | 21.4 |
| C.Ex. 8 | 2.21 | 7.07 | 0.9148 | 28800 | 87800 | 3.05 | 55.6 | 1.7 | 2.5 | 66.4 | 6.9 |
| C.Ex. 9 | 1.92 | 7.37 | 0.9195 | 28200 | 92300 | 3.27 | 56.3 | 1.5 | 1.5 | 53.9 | 14.6 |

(g) having Mc and W74 (weight fraction (% by weight) of the portion eluted below 74° C.) in CFC measurement satisfying the following relationship (i):

$$W74 < 5.5 \operatorname{Log} \{Mc\} + 15 \qquad \text{(i).}$$

8. The ethylene/α-olefin copolymer as claimed in claim 1, which is a random compolymer.

9. The ethylene/α-olefin copolymer as claimed in claim 1, wherein the ethylene/α-olefin ratio is (70 to 99.5% by weight)/(0.5 to 30% by weight).

10. The ethylene/α-olefin copolymer as claimed in claim 1, which has a melt index of 0.1 to 10 g/10 min.

11. The ethylene/α-olefin copolymer as claimed in claim 3, which has a ratio Mw/Mn of 2.0 to 3.3.

12. The ethylene/α-olefin copolymer as claimed in claim 4, which has a ratio Mw/Mn of 2.0 to 3.3.

13. An ethylene/α-olefin copolymer which is a copolymer of ethylene with an α-olefin having 3 to 20 carbon atoms, wherein the ethylene/α-olefin copolymer satisfies the following physical properties (a') to (d'):

(a') having a density of 0.900 to 0.955 g/cm³;

(b') having a melt index (MI; 190° C., under a 2.16 kg load) of 0.01 to 100 g/10 min;

(c') in a chromatogram with the use of Rayleigh ratio obtained by extrapolating GPC-MALLS data at a scattering angle of 0°, showing a chromatographic area ratio: Mc of the components having molecular weight of 1,000,000 or more, calculated on the basis of the above measurement, of 1% or more; and (d') having Mc and W74 (weight fraction (% by weight) of the portion eluted below 74° C.) in CFC measurement satisfying the following relationship (ii):

$$W74 < 5.5 \operatorname{Log} \{Mc\} + 10 \qquad \text{(ii).}$$

14. A film obtained by blown film extrusion of an ethylene/α-olefin copolymer as claimed in claim 1.

15. The film according to claim 14, which is obtained by blown film extrusion.

16. A film obtained by molding an ethylene/α-olefin copolymer as claimed in claim 13.

17. The film according to claim 16, which is obtained by blown film extrusion.

* * * * *